(12) United States Patent
Yeo et al.

(10) Patent No.: US 11,751,148 B2
(45) Date of Patent: Sep. 5, 2023

(54) METHOD AND APPARATUS FOR DATA TRANSMISSION IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Hyojin Lee, Seoul (KR); Younsun Kim, Gyeonggi-do (KR); Sungjin Park, Incheon (KR); Jinyoung Oh, Seoul (KR)

(73) Assignee: Samsung Electronics Co., Ltd

( * ) Notice: Subject to any disclaimer, the term of this patent is extended or adjusted under 35 U.S.C. 154(b) by 526 days.

(21) Appl. No.: 16/635,447

(22) PCT Filed: Sep. 18, 2018

(86) PCT No.: PCT/KR2018/010989
§ 371 (c)(1),
(2) Date: Nov. 18, 2020

(87) PCT Pub. No.: WO2019/066356
PCT Pub. Date: Apr. 4, 2019

(65) Prior Publication Data
US 2021/0345259 A1    Nov. 4, 2021

(30) Foreign Application Priority Data

Sep. 29, 2017 (KR) .................. 10-2017-0128268
Nov. 16, 2017 (KR) .................. 10-2017-0153262

(51) Int. Cl.
*H04W 56/00* (2009.01)
*H04W 28/02* (2009.01)

(52) U.S. Cl.
CPC ..... *H04W 56/001* (2013.01); *H04W 28/0278* (2013.01)

(58) Field of Classification Search
CPC .................. H04W 56/001; H04W 28/0278
(Continued)

(56) References Cited

U.S. PATENT DOCUMENTS

2009/0232050 A1    9/2009 Shen et al.
2016/0105873 A1*   4/2016 Gaal ............... H04L 1/1835
                                                         370/330
(Continued)

FOREIGN PATENT DOCUMENTS

KR    1020190028253    3/2019
WO    WO 2017/131813    8/2017

OTHER PUBLICATIONS

Samsung, "Code Rate Definition for BG Selection", R1-1716025, 3GPP TSG RAN WG1 Meeting AH_NR#3, Sep. 18-21, 2017, 4 pages.
(Continued)

*Primary Examiner* — Chandrahas B Patel
(74) *Attorney, Agent, or Firm* — The Farrell Law Firm, P.C.

(57) ABSTRACT

The present disclosure relates to a communication technique for convergence of a 5G communication system for supporting a higher data transmission rate beyond a 4G system with an IoT technology, and a system therefor. The present disclosure may be applied to intelligent services (for example, smart homes, smart buildings, smart cities, smart or connected cars, health care, digital education, retail business, security and safety-related services, etc.) on the basis of a 5G communication technology and an IoT-related technology. The present disclosure relates to a method and an apparatus for performing rate matching and configuring a soft buffer in a wireless cellular communication system.

19 Claims, 20 Drawing Sheets

(58) Field of Classification Search
USPC ........................................................ 370/350
See application file for complete search history.

(56) References Cited

U.S. PATENT DOCUMENTS

2018/0035409 A1* 2/2018 Chmiel ................. H04L 1/1835
2018/0048419 A1* 2/2018 Sandberg ............. H04L 1/0067

OTHER PUBLICATIONS

Qualcomm Incorporated, "Considerations for Soft Buffer Management", R1-1716432, 3GPP TSG-RAN WG1 NR AdHoc #3, Sep. 18-21, 2017, 8 pages.
European Search Report dated Jul. 27, 2020 issued in counterpart application No. 18863715.1-1220, 6 pages.
PCT/ISA/210 Search Report issued on PCT/KR2018/010989, pp. 5.
PCT/ISA/237 Written Opinion issued on PCT/KR2018/010989, pp. 7.
LG Electronics, "On rate matching with LDPC code for eMBB", 3GPP TSG RAN WG1 Meeting #89, R1-1707670, Hangzhou, China, May 6, 2017, pp. 7.
Intel Corporation, "Resource allocation and TBS", 3GPP TSG RAN WG1 Meeting NR#3, R1-1716320, Nagoya, Japan, Sep. 12, 2017, pp. 12.
Intel Corporation, "Finalization of remaining details of rate-matching", 3GPP TSG RAN WG1 Meeting NR #3, R1-1716329, Najoya, Japan, Sep. 12, 2017, pp. 8.

* cited by examiner

METHOD AND APPARATUS FOR DATA TRANSMISSION IN WIRELESS CELLULAR COMMUNICATION SYSTEM

PRIORITY

This application is a National Phase Entry of PCT International Application No. PCT/KR2018/010989 which was filed on Sep. 18, 2018, and claims priority to Korean Patent Application Nos. 10-2017-0128268 and 10-2017-0153262, which were filed on Sep. 29, 2017 and Nov. 16, 2017, respectively, the content of each of which is incorporated herein by reference.

BACKGROUND

1. Field

The disclosure relates to a method and an apparatus for transmitting data in a wireless cellular communication system. More particularly, the disclosure relates to a method and an apparatus for performing rate matching for data transmission and configuring a soft buffer of a terminal.

2. Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Various attempts to apply 5G communication to the IoT network are being made. For example, 5G communication technologies such as a sensor network, machine-to-machine (M2M) communication, and machine-type communication (MTC) are implemented using beamforming, MIMO, and array antenna schemes. The application of a cloud RAN as a big-data processing technology is an example of convergence of the technology and IoT technology.

In a wireless cellular and communication and broadcasting system, link performance may significantly deteriorate due to various channel noise, fading phenomena, and inter-symbol interference (ISI). Accordingly, in order to realize high-speed digital communication and broadcasting systems that require high data throughput and high reliability, such as next-generation mobile communication, digital broadcasting, and the mobile Internet, it is needed to develop a technology for removing noise, fading, and inter-symbol interference. As research on noise removal, research on error correcting code has been actively conducted recently to realize a method of increasing reliability of communication by efficiently reconstructing distorted information.

DISCLOSURE OF INVENTION

Technical Problem

The disclosure provides a method and an apparatus for performing rate matching to transmit downlink and uplink data and determining and managing the size of a soft buffer of a terminal.

Solution to Problem

In accordance with an aspect of the disclosure, a method of a terminal is provided. The method includes: encoding an information bit and generating an encoded bit; performing rate matching on the encoded bit; and transmitting the rate-matched encoded bit to an base station, wherein the rate matching is performed in the case in which limited buffer rate matching (LBRM) is configured by a higher layer, based on a transport block size (TBS) when a preset condition is applied.

In accordance with another aspect of the disclosure, a terminal is provided. The terminal includes: a transceiver configured to transmit and receive a signal; and a controller configured to encode an information bit, generate an encoded bit, perform rate matching on the encoded bit, and transmit the rate-matched encoded bit to an base station, wherein the rate matching is performed in the case in which limited buffer rate matching (LBRM) is configured by a higher layer, based on a transport block size (TBS) when a preset condition is applied.

In accordance with another aspect of the disclosure, a method of an base station is provided. The method includes:

encoding an information bit and generating an encoded bit; performing rate matching on the encoded bit; and transmitting the rate-matched encoded bit to a terminal, wherein the rate matching is performed in the case in which limited buffer rate matching (LBRM) is configured by a higher layer, based on a transport block size (TBS) when a preset condition is applied.

In accordance with another aspect of the disclosure, an base station is provided. The base station includes: a transceiver configured to transmit and receive a signal; and a controller configured to encode an information bit, generate an encoded bit, perform rate matching on the encoded bit, and transmit the rate-matched encoded bit to a terminal, wherein the rate matching is performed in the case in which limited buffer rate matching (LBRM) is configured by a higher layer, based on a transport block size (TBS) when a preset condition is applied.

Advantageous Effects of Invention

The disclosure provides a rate-matching method and apparatus that take into consideration a soft buffer of a terminal and decoding performance when transmitting data.

MODE FOR THE INVENTION

Figure 1:
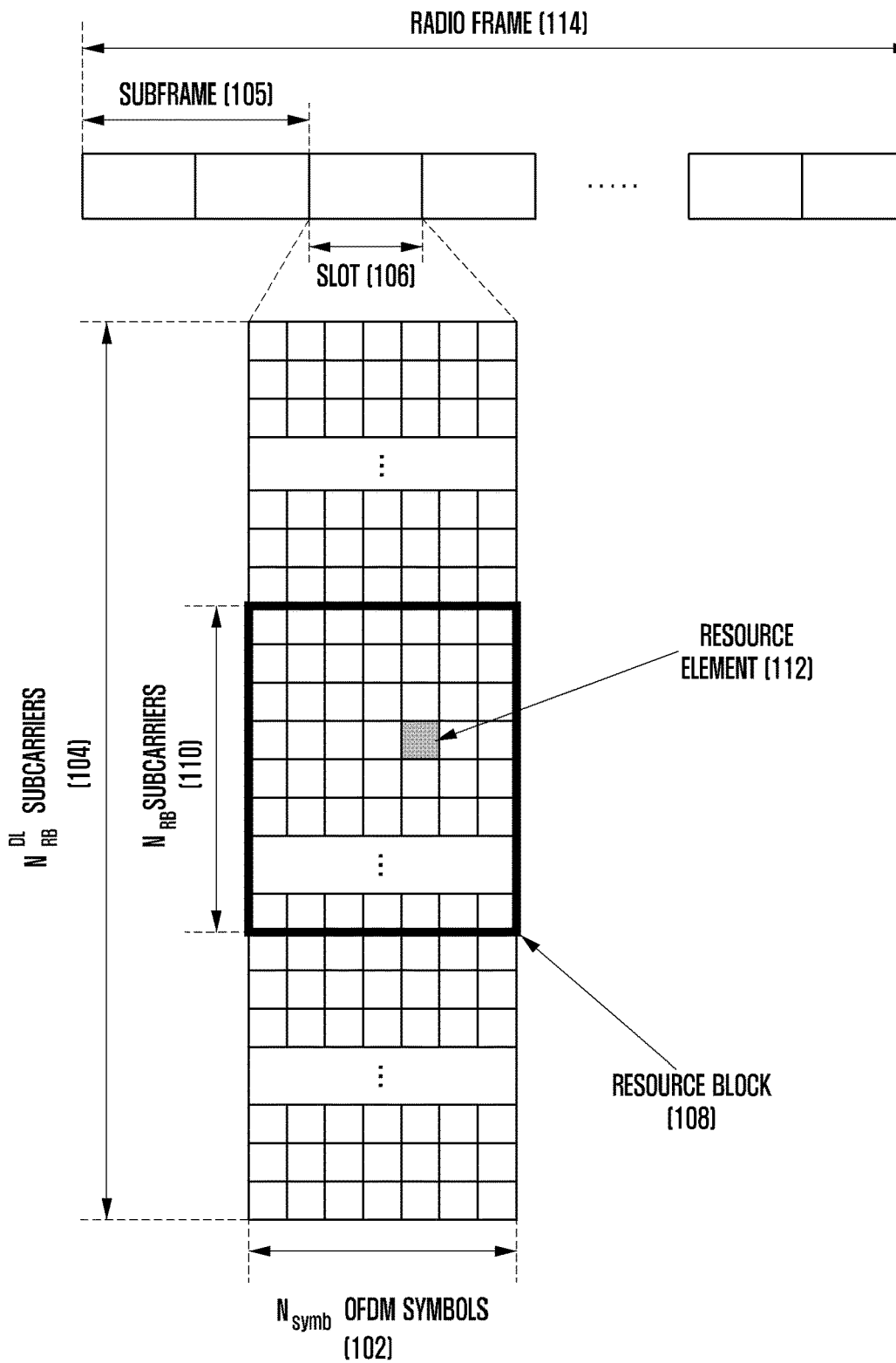
FIG. 1 illustrates the structure for transmission of downlink time-frequency domains in an LTE or LTE-A system.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

A wireless communication system has developed to be a broadband wireless communication system that provides a high speed and high quality packet data service, like the communication standards, for example, High Speed Packet Access (HSPA) of 3GPP, Long Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided at the initial stage. Also, communication standard of 5G or new radio (NR) is being developed as a 5G wireless communication system.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification. Hereinafter, an base station is the entity that allocates resources to a terminal, and may be at least one of a gNode B, an eNode B, a Node B, a base station (BS), a radio access unit, an base station controller, and a node on a network. The terminal may include a user equipment (UE), a mobile station (MS), a cellular phone, a smart phone, a computer, or a multimedia system capable of performing a communication function. In the disclosure, "downlink (DL)" refers to a wireless transmission path of a signal that the BS transmits to the terminal, and "uplink (UL)" refers to a wireless transmission path of a signal that the UE transmits to the BS. Embodiments of the disclosure are described with reference to the LTE or LTE-A system by way of example, but the embodiments of the disclosure may be applied to other communication systems having a similar technical background or channel form. For example, 5th-generation mobile communication technology (5G, new radio, and NR), developed after LTE-A, may be included therein. In addition, the embodiment of the disclosure may be applied to other communication systems through some modifications without departing from the scope of the disclosure on the basis of the determination of those skilled in the art.

An LTE system, which is a representative example of a broadband wireless communication system, employs an orthogonal frequency-division multiplexing (OFDM) scheme for a downlink (DL), and employs a single-carrier frequency-division multiple access (SC-FDMA) scheme for an uplink (UL). The uplink is a radio link through which the terminal (a user equipment (UE) or a mobile station (MS)) transmits data or a control signal to the base station (an eNodeB or a base station (BS)), and the downlink is a radio link through which the base station transmits data or a control signal to the terminal. In the multiple access schemes as described above, time-frequency resources for carrying data or control information are allocated and operated in a manner to prevent overlapping of the resources, i.e. to establish orthogonality, between users, so as to identify data or control information of each user.

If decoding fails in initial transmission, the LTE system employs Hybrid Automatic Repeat request (HARQ) of retransmitting the corresponding data in a physical layer. In the HARQ scheme, when a receiver does not accurately decode data, the receiver transmits information (negative acknowledge: NACK) informing the transmitter of decoding failure and thus the transmitter may re-transmit the corresponding data on the physical layer. The receiver may combine data retransmitted from the transmitter and previous data, the decoding of which failed, whereby data reception performance may increase. Also, if the receiver accurately decodes data, the receiver transmits information (acknowledgement: ACK) reporting that decoding is successfully executed, so that the transmitter transmits new data.

FIG. 1 illustrates the basic structure of time-frequency domains, which are radio resource regions within which data or a control channel is transmitted in a downlink of an LTE system.

In FIG. 1, the horizontal axis indicates the time domain, and the vertical axis indicates the frequency domain. In the time domain, the minimum transmission unit is an OFDM symbol. One slot 106 includes Nsymb OFDM symbols 102, and one subframe 105 includes two slots. The length of one slot is 0.5 ms, and the length of one subframe is 1.0 ms. A radio frame 114 is a time domain section including 10 subframes. The minimum transmission unit in the frequency domain is a subcarrier. The entire system transmission bandwidth may include a total of NBW subcarriers 104.

The basic resource unit in the time-frequency domains is a resource element (RE) 112, which may be indicated by an OFDM symbol index and a subcarrier index. A resource block (RB) 108 (or physical resource block (PRB)) is defined by Nsymb consecutive OFDM symbols 102 in the time domain and NRB consecutive subcarriers 110 in the frequency domain. Therefore, one RB 108 includes NsymbxNRB REs 112. Generally, the minimum transmission unit of data is an RB. In the LTE system, generally, Nsymb=7 and NRB=12. NBW and NRB are proportional to a system transmission bandwidth. A data rate increases in proportion to the number of RBs scheduled to the terminal.

The LTE system defines and operates 6 transmission bandwidths. In the case of an FDD system, in which the downlink and the uplink are divided according to frequency, a downlink transmission bandwidth and an uplink transmission bandwidth may be different from each other. A channel bandwidth may indicate an RF bandwidth corresponding to a system transmission bandwidth. [Table 1] shows the relationship between a system transmission bandwidth and a channel bandwidth defined in the LTE system. For example, when the LTE system has a channel bandwidth of 10 MHz, the transmission bandwidth may include 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Downlink control information may be transmitted within first N OFDM symbols in the subframe. Generally, N={1, 2, 3}. Therefore, the value of N varies for each subframe depending on the amount of control information to be transmitted in the current subframe. The control information may include a control channel transmission interval indicator indicating the number of OFDM symbols via which control information is to be transmitted, scheduling information associated with downlink data or uplink data, a HARQ ACK/NACK signal, or the like.

In the LTE system, scheduling information associated with downlink data or uplink data may be transmitted from the base station to the terminal through downlink control information (DCI). The DCI is defined in various formats. A DCI format may be determined and applied for operation, based on whether scheduling information is for uplink data (UP grant) or for downlink data (DL grant), whether it is compact DCI of which the control information is small, whether spatial multiplexing using multiple antennas is applied, whether it is used for controlling power, and the like. For example, DCI format 1, corresponding to scheduling control information on downlink data (DL grant), may be configured to include at least the following control information.

Resource allocation type 0/1 flag: indicates whether a resource allocation type is type 0 or type 1. Type 0 applies a bitmap scheme and allocates resources in units of resource block groups (RBGs). In the LTE system, a basic scheduling unit is a resource block (RB), indicated by time and frequency domain resources, and an RBG includes a plurality of RBs and is used as a basic scheduling unit in the type 0 scheme. Type 1 allows allocation of a predetermined RB in an RBG.

Resource block assignment: indicates RBs allocated to data transmission. Expressed resources are determined according to the system bandwidth and resource allocation scheme.

Modulation and coding scheme (MCS): indicates a modulation scheme used for data transmission and the size of a transport block, which is data to be transmitted.

HARQ process number: indicates a process number of HARQ.

New data indicator: indicates HARQ initial transmission or HARQ retransmission.

Redundancy version: indicates a redundancy version of HARQ.

Transmit power control (TPC) command for physical uplink control channel (PUCCH): indicates a transmission power control command for a PUCCH, which is an uplink control channel.

The DCI is transmitted through a physical downlink control channel (PDCCH) (or control information, "PDCCH" being interchangeable with "control information" hereinafter) or an enhanced PDCCH (EPDCCH) (or enhanced control information, "EPDCCH" being interchangeable with "enhanced control information" hereinafter) via a channel coding and modulation process.

Generally, the DCI is scrambled with a predetermined radio network temporary identifier (RNTI) (or a terminal identifier), independently for each terminal, a cyclic redundancy check (CRC) is added, and channel coding is performed, whereby each independent PDCCH is configured and transmitted. In the time domain, a PDCCH is mapped and transmitted during the control channel transmission interval. The mapping location of the PDCCH in the frequency domain is determined by the identifier (ID) of each terminal, and is propagated to the entire system transmission band.

Downlink data is transmitted through a physical downlink shared channel (PDSCH), which is a physical downlink data channel. The PDSCH is transmitted after the control channel transmission interval, and the detailed mapping location in the frequency domain and scheduling information, such as the modulation scheme, are indicated through DCI transmitted through the PDCCH.

Via an MCS formed of 5 bits in the control information included in the DCI, the base station may report the modulation scheme applied to a PDSCH to be transmitted to the terminal and the size (transport block size (TBS)) of data to be transmitted. The TBS corresponds to the size before channel coding for error correction is applied to the data (TB) to be transmitted by the base station.

The modulation schemes supported by the LTE system include quadrature phase-shift keying (QPSK), 16 quadrature amplitude modulation (16 QAM), and 64 QAM. Modulation orders (Qm) correspond to 2, 4, and 6 respectively. That is, in the case of QPSK modulation, 2 bits are transmitted per symbol. In the case of 16 QAM modulation, 4 bits are transmitted per symbol. In the case of 64 QAM modulation, 6 bits are transmitted per symbol.

Figure 2:
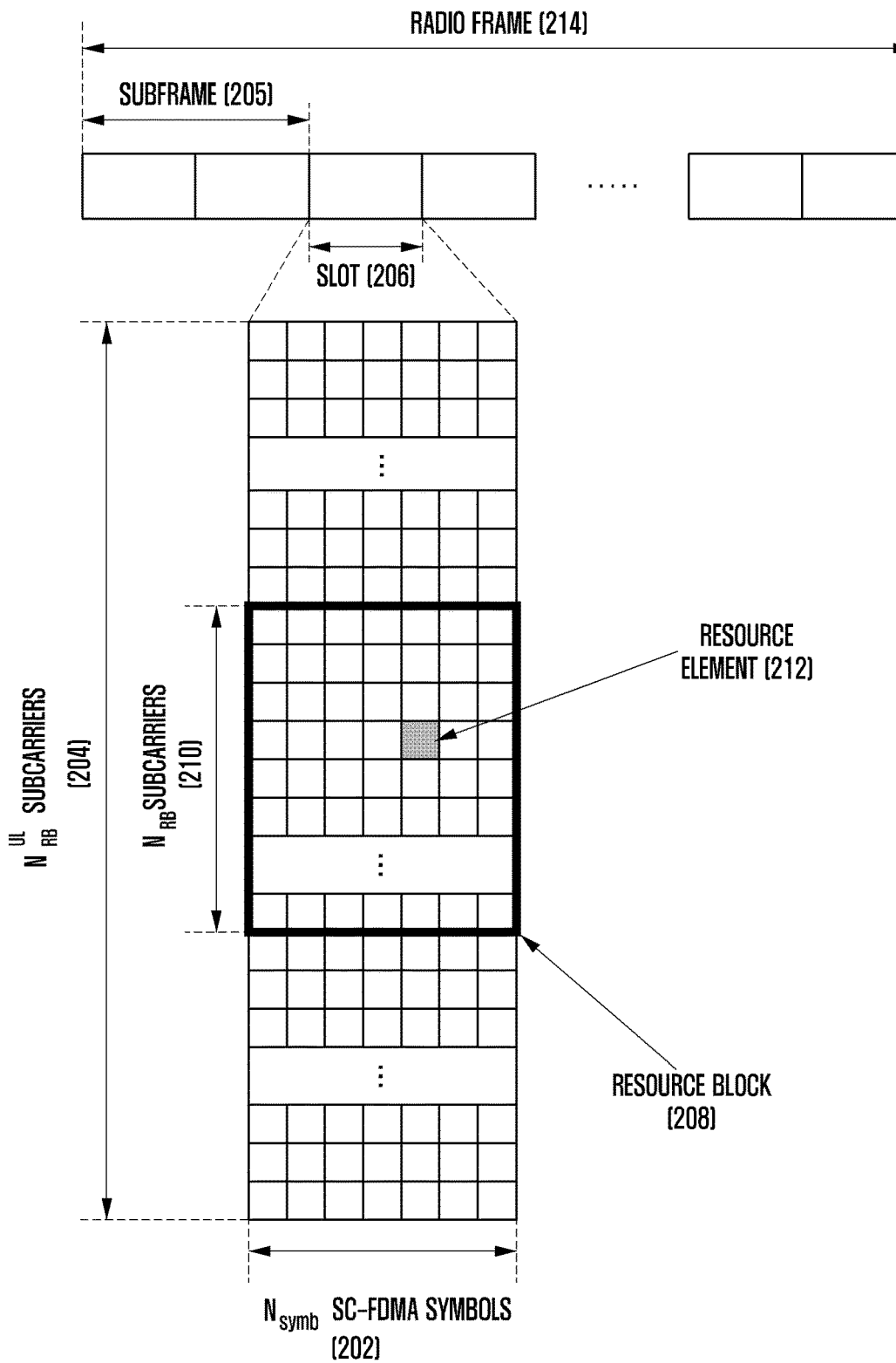
FIG. 2 illustrates the structure for transmission of uplink time-frequency domains in an LTE or LTE-A system.

FIG. 2 illustrates the basic structure of time-frequency domains, which are radio resource regions in which data or a control channel is transmitted in an uplink of an LTE-A system according to the prior art.

Referring to FIG. 2, the horizontal axis indicates the time domain and the vertical axis indicates the frequency domain. The minimum transmission unit in the time region is an SC-FDMA symbol 202, and one slot 206 includes NsymbUL SC-FDMA symbols. One subframe 205 includes two slots. The minimum transmission unit in the frequency region is a subcarrier, and an entire system transmission band (transmission bandwidth) 204 includes a total of NBW subcarriers. NBW has a value proportional to a system transmission band.

The basic resource unit in the time-frequency domains is a resource element (RE) 212, which may be defined by an SC-FDMA symbol index and a subcarrier index. A resource block pair (RB pair) 208 is defined by NsymbUL consecutive SC-FDMA symbols in the time domain and NscRB consecutive subcarriers in the frequency domain. Accordingly, one RB includes NsymbUL×NscRB REs. In general, the minimum transmission unit of data or control information is an RB unit. A PUCCH is mapped to a frequency domain corresponding to 1 RB, and may be transmitted during one subframe.

The timing relationship between a PDSCH, which is a physical channel for downlink data transmission, or a PDCCH/EPDDCH including semi-persistent scheduling release (SPS release), and a PUCCH or a PUSCH, which is an uplink physical channel for transmitting an HARQ ACK/NACK, is defined in the LTE system. For example, in the LTE system, which operates according to frequency division duplex (FDD), an HARQ ACK/NACK corresponding to a PDCCH or EPDDCH including SPS release or a PDSCH transmitted in an (n−4)th subframe is transmitted via a PUCCH or a PUSCH in an nth subframe.

In the LTE system, a downlink HARQ employs an asynchronous HARQ scheme in which a data retransmission time point is not fixed. That is, if the base station receives an HARQ NACK feedback of initially transmitted data, which the base station transmits, from the terminal, the base station freely determines the time point at which retransmitted data is transmitted via a scheduling operation. For the HARQ operation, the terminal buffers data which is determined to be erroneous on the basis of the result of decoding received data, and then combines the data and subsequently retransmitted data.

If the terminal receives a PDSCH including downlink data transmitted from the base station in subframe n, the terminal transmits uplink control information including an HARQ ACK or NACK of the downlink data in subframe (n+k) through a PUCCH or a PUSCH. In this instance, k is defined differently depending on whether the LTE system adopts FDD or time-division duplex (TDD) and on the configuration thereof. For example, in the case of the FDD LTE system, k is fixed to 4. Meanwhile, in the case of the TDD LTE system, k may be changed according to a subframe configuration and a subframe number.

In the LTE system, the uplink HARQ employs a synchronous HARQ scheme, in which a data retransmission time point is fixed, unlike the downlink HARQ. That is, the uplink/downlink timing relationship between a physical uplink shared channel (PUSCH), which is a physical channel for uplink data transmission, and a PDCCH, which is a downlink control channel preceding the PUSCH and a physical hybrid indicator channel (PHICH), which is a physical channel for transmitting a downlink HARQ ACK/NACK, corresponding to the PUSCH, is fixed by the rule as follows.

If the terminal receives a PHICH for transmission of a downlink HARQ ACK/NACK or a PDCCH including uplink scheduling control information transmitted from the base station in subframe n, the terminal transmits uplink data corresponding to the control information in subframe (n+k) through a PUSCH. In this instance, k is defined differently depending on whether the LTE system adopts FDD or time-division duplex (TDD) and the configuration thereof. For example, in the case of the FDD LTE system, k is fixed to 4. Meanwhile, in the case of the TDD LTE system, k may be changed according to a subframe configuration and a subframe number.

Further, if the terminal receives a PHICH carrying a downlink HARQ ACK/NACK from the base station in subframe i, the PHICH corresponds to a PUSCH transmitted by the terminal in subframe (i-k). At this time, k is defined differently depending on whether the LTE system uses FDD or TDD and the configuration thereof. For example, in the case of the FDD LTE system, k is fixed to 4. Meanwhile, in the case of the TDD LTE system, k may be changed according to a subframe configuration and a subframe number.

Further, when data is transmitted through a plurality of carriers, k may be applied differently depending on the TDD configuration of each carrier.

TABLE 2

| Transmission mode | DCI format | Search Space | Transmission scheme of PDSCH corresponding to PDCCH |
|---|---|---|---|
| Mode 1 | DCI format 1A | Common and UE specific by C-RNTI | Single-antenna port, Port 0 (see subclause 7.1.1) |
|  | DCI format 1 | UE specific by C-RNTI | Single-antenna port, port 0 (see subclause 7.1.1) |
| Mode 2 | DCI format 1A | Common and UE specific by C-RNTI | Transmit diversity (see subclause 7.1.2) |
|  | DCI format 1 | UE specific by C-RNTI | Transmit diversity (see subclause 7.1.2) |
| Mode 3 | DCI format 1A | Common and UE specific by C-RNTI | Transmit diversity (see subclause 7.1.2) |
|  | DCI format 2A | UE specific by C-RNTI | Large delay CDD (see subclause 7.1.3) or Transmit diversity (see subclause 7.1.2) |
| Mode 4 | DCI format 1A | Common and UE specific by C-RNTI | Transmit diversity (see subclause 7.1.2) |
|  | DCI format 2 | UE specific by C-RNTI | Closed-loop spatial multiplexing (see subclause 7.1.4) or Transmit diversity (see subclause 7.1.2) |
| Mode 5 | DCI format 1A | Common and UE specific by C-RNTI | Transmit diversity (see subclause 7.1.2) |
|  | DCI format 1D | UE specific by C-RNTI | Multi-user MIMO (see subclause 7.1.5) |
| Mode 6 | DCI format 1A | Common and UE specific by C-RNTI | Transmit diversity (see subclause 7.1.2) |
|  | DCI format 1B | UE specific by C-RNTI | Closed-loop spatial multiplexing (see subclause 7.1.4) using a single transmission layer |
| Mode 7 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |

TABLE 2-continued

| Transmission mode | DCI format | Search Space | Transmission scheme of PDSCH corresponding to PDCCH |
|---|---|---|---|
| | DCI format 1 | UE specific by C-RNTI | Single-antenna port, port 5 (see subclause 7.1.1) |
| Mode 8 | DCI format 1A | Common and UE specific by C-RNTI | If the number of PBCH antenna ports is one, Single-antenna port, port 0 is used (see subclause 7.1.1), otherwise Transmit diversity (see subclause 7.1.2) |
| | DCI format 2B | UE specific by C-RNTI | Dual layer transmission, port 7 and 8 (see subclause 7.1.5A) or single-antenna port, port 7 or 8 (see subclause 7.1.1) |

[Table 2] above shows supportable DCI formats according to each transmission mode in a condition set by a C-RNTI in 3GPP TS 36.213. The terminal assumes the existence of the corresponding DCI format in a control area interval according to a preset transmission mode and performs a search and decoding. For example, if transmission mode 8 is indicated to the terminal, the terminal searches for DCI format 1A in a common search space and a UE-specific search space and searches for DCI format 2B only in the UE-specific search space.

The description about the wireless communication system is provided from the perspective of the LTE system, but the disclosure is not limited to the LTE system, and may be applied to various wireless communication systems such as NR, 5G, or the like. Further, if the embodiment of the disclosure is applied to another wireless communication system, the value of k may also be changed and applied to a system using a modulation scheme corresponding to FDD.

In a communication/broadcasting system, link performance may significantly deteriorate due to various channel noise, fading phenomena, and inter-symbol interference (ISI). Accordingly, in order to realize high-speed digital communication and broadcasting systems that require high data throughput and high reliability, such as next-generation mobile communication, digital broadcasting, and portable Internet, it is needed to develop a technology for removing such noise, fading, and inter-symbol interference. As research on noise removal, research on error correction code has been actively conducted recently to realize a method of increasing the reliability of communication by efficiently reconstructing distorted information.

The disclosure provides a method and an apparatus for transmitting a coding bit which may support various input lengths and code rates. Further, the disclosure provides a method of configuring a base graph of a low-density parity check (LDPC) code used for data channel transmission and a method and an apparatus for segmenting a transport block (TB) using the LDPC code.

Subsequently, a low-density parity check (LDPC) code will be described.

The LDPC code is a type of linear block code and includes a process of determining a codeword that satisfies a condition such as [Equation 1] below.

$$H \cdot c^T = [h_1\ h_2\ h_3 \ldots h_{N_{ldpc}-1}] \cdot c^T = \sum_{i=0}^{N_{ldpc}} c_i \cdot h_i = 0 \quad \text{[Equation 1]}$$

In [Equation 1], $c=[c_0, c_1, c_2, \ldots c_{N_{ldpc}-1}]$.

In [Equation 1], H denotes a parity check matrix, C denotes a codeword, $c_i$ denotes an ith bit of a codeword, and Nldpc denotes a codeword length. Here, hi denotes an ith column of the parity check matrix (H).

The parity check matrix H includes Nldpc columns, the Nldpc being the same as the number of bits of the LDPC codeword. [Equation 1] means that the sum of the products of ith columns (hi) of the parity check matrix and an ith codeword bit ci is "0", and thus the ith column (hi) is relevant to the ith codeword bit ci.

For the parity check matrix used in the communication and broadcasting system, a quasi-cyclic LDPC code (or a QC-LDPC code, hereinafter, referred to as the QC-LDPC code), generally using a quasi-cyclic parity check matrix, is frequently used for easy implementation.

The QC-LDPC code features a parity check matrix including a 0-matrix (zero matrix) having a square matrix form or a circulant permutation matrix.

As shown in [Equation 2], a permutation matrix $P=(P_{ij})$ having a size of Z×Z is defined.

$$P_{i,j} = \begin{cases} 1, & \text{if } i+1 \equiv j \bmod Z \\ 0, & \text{otherwise} \end{cases} \quad \text{[Equation 2]}$$

In [Equation 2], $P_{ij}$ (0≤i, j<Z) is an element (entry) in an ith row and a jth column of the matrix P. On the basis of 0≤i<Z for the permutation matrix described above, it may be noted that P is a circulant permutation matrix obtained by circularly shifting each element of an identity matrix having a size of Z×Z to the right by i.

The parity check matrix H of the simplest QC-LDPC code may be indicated as shown in [Table 3] below.

$$H = \begin{bmatrix} P^{a_{11}} & P^{a_{12}} & \cdots & P^{a_{1n}} \\ P^{a_{21}} & P^{a_{22}} & \cdots & P^{a_{2n}} \\ \vdots & \vdots & \ddots & \vdots \\ P^{a_{m1}} & P^{a_{m2}} & \cdots & P^{a_{mn}} \end{bmatrix} \quad \text{[Equation 3]}$$

If P−1 is defined as a 0-matrix having the size of Z×Z, each exponent aij of the circulant permutation matrix or the 0-matrix has one value among {−1, 0, 1, 2, . . . , Z−1} in [Equation 3] above. Further, it may be noted that the parity check matrix H of [Equation 3] has a size of Z×Z since it has n column blocks and m row blocks.

In general, a binary matrix having a size of m×n, obtained by replacing the circulant permutation matrix and the 0-matrix in the parity check matrix of [Equation 3] with 1 and 0, is determined as a mother matrix M(H) (or a base graph) of the parity check matrix H, and an integer matrix having a size of m×n, obtained by selecting only exponents of the circulant permutation matrix or the 0-matrix as shown in

[Equation 4] below, is determined as an exponent matrix E(H) of the parity check matrix H.

$$E(H) = \begin{bmatrix} a_{11} & a_{12} & \cdots & a_{1n} \\ a_{21} & a_{22} & \cdots & a_{2n} \\ \vdots & \vdots & \ddots & \vdots \\ a_{m1} & a_{m2} & \cdots & a_{mn} \end{bmatrix}$$ [Equation 4]

Meanwhile, the performance of an LDPC code may be determined according to the parity check matrix. Accordingly, it is required to design a parity check matrix for an LDPC code having excellent performance. Further, an LDPC encoding and decoding method for supporting various input lengths and code rates is needed.

A method known as lifting is used for efficient design of the QC-LDPC code. Lifting is a method of efficiently designing a very large parity check matrix by configuring a Z value for determining the size of a circulant permutation matrix or a 0-matrix from a given small mother matrix according to a specific rule. The conventional lifting method and the characteristics of the QC-LDPC code designed through lifting are briefly described below.

If an LDPC code C0 is given, S QC-LDPC codes to be designed through the lifting method are C1, C2, . . . , Ck, . . . , CS (similarly, Ck for 1≤k≤S), a parity check matrix of the QC-LDPC code Ck is Hk, and a value corresponding to the size of row blocks and column blocks of the circulant matrix included in the parity check matrix is Zk. C0 corresponds to the smallest LDPC code having a mother matrix of C1, . . . , and CS codes as a parity check matrix, a Z0 value corresponding to the size of row blocks and column blocks is 1, and Zk<Zk+1 for 0≤k≤S−1. For convenience, a parity check matrix Hk of each code Ck has an exponent matrix E(Hk))=ai,j(k) having a size of m×n, and one of the values {−1, 0, 1, 2, . . . , Zk−1} is selected as each exponent ai,j(k). The lifting includes steps of C0−C1→ . . . →CS and features Zk+1=qk+1Zk (qk+1 is a positive integer, k=0, 1, . . . , S−1). If only the parity check matrix HS of the CS is stored due to the characteristics of the lifting process, all the QC-LDPC codes C0, C1, . . . , CS can be indicated using [Equation 5] or [Equation 6] below according to the lifting method.

$$E(H_k) \equiv \left\lfloor \frac{L_k}{L_s} E(H_s) \right\rfloor$$ [Equation 5]

$$E(H_k) \equiv E(H_s) \bmod Z_k$$ [Equation 6]

The above equation may be expressed as [Equation 7] in the most generalized form.

$$P_{i,j} = f(V_{i,j}, Z)$$ [Equation 7]

In [Equation 7] above, f(x,y) is a predetermined function having x and y as input values. $V_{i,j}$ is an element corresponding to an ith row and a jth column of an exponent matrix of the parity check matrix corresponding to the largest LDPC code (for example, corresponding to the CS in the above description). $P_{i,j}$ is an element corresponding to an ith row and a jth column of an exponent matrix of the parity check matrix corresponding to the LDPC code having a predetermined size (for example, corresponding to Ck in the above description), and Z is the size of row blocks and column blocks of the circulant matrix included in the parity check matrix of the corresponding LDPC code. Accordingly, if $V_{i,j}$ is defined, a parity check matrix for an LDPC code having a predetermined size can be defined.

In the description of the disclosure below, the above-described symbols are named, defined, and used as follows.

[Definition 1]

$E(H_S)$: Maximum Exponential Matrix $V_{i,j}$: maximum exponential matrix element (corresponding to $(i,j)^{th}$ element of $E(H_S)$)

A parity check matrix of a predetermined LDPC code may be expressed using the above-defined maximum exponential matrix or maximum exponential matrix element.

In order to guarantee optimal performance of code blocks having various lengths, there may be a plurality of maximum exponential matrixes defined above in the next-generation mobile communication system. For example, M different maximum exponential matrixes may exist, which may be expressed by [Equation 8] below.

$$E(H_S)_1, E(H_S)_2, \ldots, E(H_S)_M$$ [Equation 8]

There may be a plurality of maximum exponential matrix elements corresponding thereto, which may be expressed as follows.

$$(V_{i,j})_1, (V_{i,j})_2, \ldots, (V_{i,j})_M$$ [Equation 9]

In [Equation 9], a maximum exponential matrix element $(V_{i,j})_m$ corresponds to (i, j) of a maximum exponential matrix $E(H_S)_m$. Hereinafter, the definition of the parity check matrix for the LDPC code according to the disclosure will be described using the above-defined maximum exponential matrix. This may be applied to be the same as the expression using the maximum exponent matrix element.

A turbo code-based code block segmentation and CRC attachment method in a document of LTE TS 36.213 is described.

---

5.1.2 Code block segmentation and code block CRC attachment

The input bit sequence to the code block segmentation is denoted by $b_0, b_1, b_2, b_3, \ldots, b_{B-1}$, where B > 0. If B is larger than the maximum code block size Z, segmentation of the input bit sequence is performed and an additional CRC sequence of L = 24 bits is attached to each code block. The maximum code block size is:
- Z = 6144.

If the number of filler bits F calculated below is not 0, filler bits are added to the beginning of the first block.
    Note that if B < 40, filler bits are added to the beginning of the code block.
The filler bits shall be set to <NULL> at the input to the encoder.
Total number of code blocks C is determined by:
if B ≤ Z
    L = 0
    Number of code blocks: C = 1
    B' = B

| 5.1.2 Code block segmentation and code block CRC attachment |
|---|
| else<br>    L = 24<br>    Number of code blocks: C = [B|(Z − L)].<br>    B' = B + C · L<br>end if<br>The bits output from code block segmentation, for C ≠ 0, are denoted by $c_{r0}, c_{r1}, c_{r2}, c_{r3},...,c_{r(K_r-1)}$ , where r is the code, block number, and $K_r$ is the number of bits for the code block number r.<br>  Number of bits in each, code block (applicable for C ≠ 0 only):<br>    First segmentation size: $K_+$ = minimum K in table 5.1.3-3 such that C · K ≥ B'<br>    if C = 1<br>        the number of code blocks with length $K_+$ is $C_+$ =1, $K_-$ =0, $C_-$ =0<br>    else if C > 1<br>        Second segmentation size: $K_-$ = maximum K in table 5.1.3-3 such that K < $K_+$<br>        $\Delta_K = K_+ - K_-$<br>        Number of segments of size $K_-$: $C_- = \left\lfloor \frac{C \cdot K_+ - B'}{\Delta_K} \right\rfloor$.<br>        Number of segments of size $K_+$: $C_+ = C - C_-$.<br>    end if<br>    Number of filler bits: $F = C_+ \cdot K_+ + C_- \cdot K_- - B'$<br>    for k = 0 to F-1                                      -- Insertion of filler bits<br>        $c_{ok}$ =<NULL><br>    end for<br>    k = F<br>    s = 0<br>    for r = 0 to C-1<br>        if r < $C_-$<br>            $K_r = K_-$<br>        else<br>            $K_r = K_+$<br>        end if<br>        while k < $K_r$ − L<br>            $c_{rk} = b_s$<br>            k = k + 1<br>            s = s + 1<br>        end while<br>        if C >1<br>            The sequence $c_{r0},c_{r1},c_{r2},c_{r3},...,c_{r(K_r-L-1)}$ is used to calculate the CRC parity bits<br>            $P_{r0}, P_{r1}, P_{r2},..., P_{r(L-1)}$ according to section 5.1.1 with the generator polynomial<br>            $g_{CRC24B}(D)$. For CRC calculation it is assumed that filler bits, if present,<br>            have the value 0.<br>            while k < $K_r$<br>                $c_{rk} = P_{r(k+L-K_r)}$<br>                k = k + 1<br>            end while<br>        end if<br>        k = 0<br>    end for |

5G and next-generation communication systems use the LDPC code in a data channel, unlike the LTE system. Even in the situation in which the LDPC code is applied, one transport block may be divided into a plurality of code blocks, and some code blocks thereof may form one code block group. Further, the numbers of code blocks of respective code block groups may be the same as each other, or may have different values. Interleaving in units of bits may be applied to an individual code block, a code block group, or a transport block.

Figure 3:
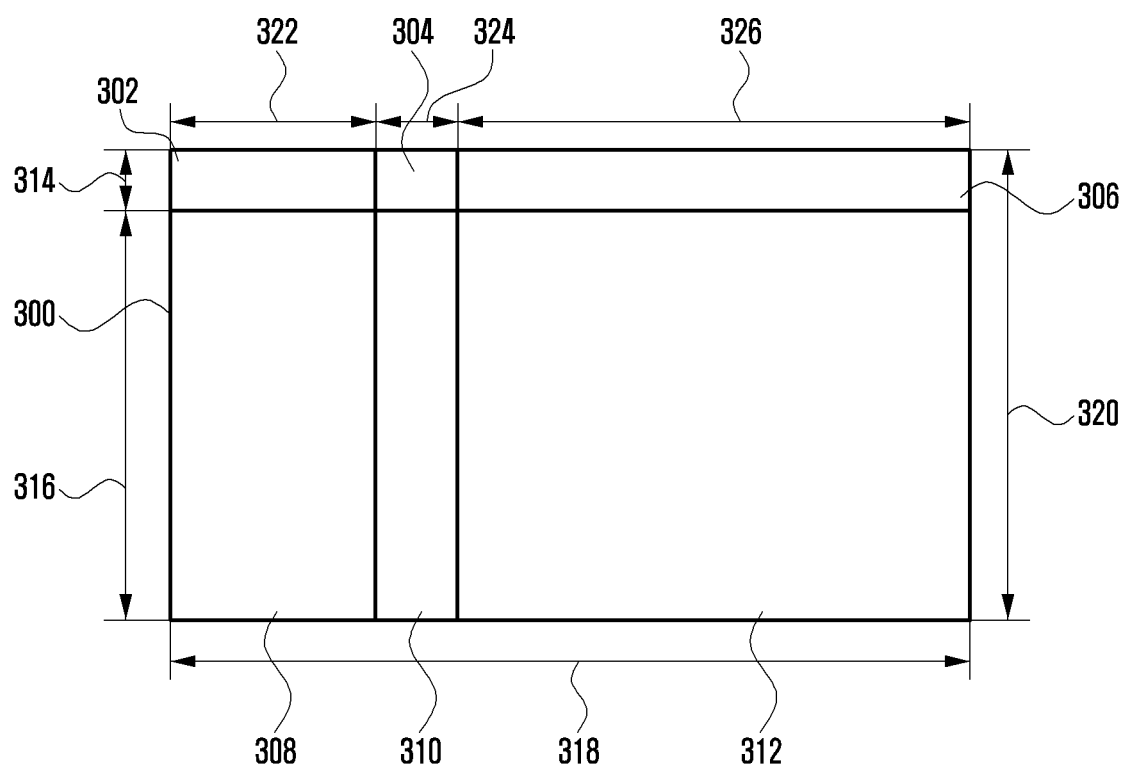
FIG. 3 illustrates the basic structure of a mother matrix (or a base graph) of the LDPC code.

FIG. 3 illustrates the basic structure of a mother matrix (or a base graph) of the LDPC code.

In FIG. 3, two basic structures of a base graph 300 of the LDPC code supporting data channel coding are fundamentally supported by the next-generation mobile communication system. The first base graph structure of the LDPC code is a matrix structure having a maximum vertical length 320 of 46 and a maximum horizontal length 318 of 68, and the second base graph structure of the LDPC code is a matrix structure having a maximum vertical length 320 of 42 and a maximum horizontal length 318 of 52. The first base graph structure of the LPDC code may support a minimum code rate of 1/3 to a maximum code rate of 8/9, and the second base graph structure of the LDPC may support a minimum code rate of 1/5 to a maximum code rate of 8/9.

Basically, the LDPC code may include 6 sub matrix structures. A first sub matrix structure 302 includes system bits. A second sub matrix structure 304 is a square matrix and includes parity bits. A third sub matrix structure 306 is a zero matrix. A fourth sub matrix structure 308 and a fifth sub matrix structure 310 include parity bits. A sixth sub matrix structure 312 is a unit matrix.

In the first base graph structure of the LDPC code, a horizontal length 322 of the first sub matrix 302 has a value of 22 and a vertical length 314 has a value of 4 or 5. Both a horizontal length 324 and a vertical length 314 of the second sub matrix 304 have a value of 4 or 5. A horizontal length 326 of the third sub matrix 306 has a value of 42 or 41 and a vertical length 314 has a value of 4 or 5. A vertical length 316 of the fourth sub matrix 308 has a value of 42 or 41 and a horizontal length 322 has a value of 22. A horizontal length 324 of the fifth sub matrix 310 has a value of 4 or 5 and a vertical length 316 has a value of 42 or 41. Both a horizontal length 326 and a vertical length 316 of the sixth sub matrix 312 have a value of 42 or 31.

In the second base graph structure of the LDPC code, a horizontal length 322 of the first sub matrix 302 has a value of 10 and a vertical length 314 has a value of 7. Both a horizontal length 324 and a vertical length 314 of the second sub matrix 304 have a value of 7. A horizontal length 326 of the third sub matrix 306 has a value of 35 and a vertical length 314 has a value of 7. A vertical length 316 of the fourth sub matrix 308 has a value of 35 and a horizontal length 322 has a value of 10. A horizontal length 324 of the fifth sub matrix 310 has a value of 7 and a vertical length 316 has a value of 35. Both a horizontal length 326 and a vertical length 316 of the sixth sub matrix 312 have a value of 35.

One code block size supportable by the first base graph structure of the LDPC code is 22×Z (Z=a×2j and Z is as shown in [Table 3] below. A maximum size of one supportable code block is 8448 and a minimum size of one supportable code block is 44. For reference, some or all of (272, 304, 336, 368) may be additionally reflected as a candidate of Z in [Table 3]).

TABLE 3

| | | | | | a | | | |
|---|---|---|---|---|---|---|---|---|
| Z | | 2 | 3 | 5 | 7 | 9 | 11 | 13 | 15 |
| j | 0 | 2 | 3 | 5 | 7 | 9 | 11 | 13 | 15 |
| | 1 | 4 | 6 | 10 | 14 | 18 | 22 | 26 | 30 |
| | 2 | 8 | 12 | 20 | 28 | 36 | 44 | 52 | 60 |
| | 3 | 16 | 24 | 40 | 56 | 72 | 88 | 104 | 120 |
| | 4 | 32 | 48 | 80 | 112 | 144 | 176 | 208 | 240 |
| | 5 | 64 | 96 | 160 | 224 | 288 | 352 | | |
| | 6 | 128 | 192 | 320 | | | | | |
| | 7 | 256 | 384 | | | | | | |

In the first base graph structure of the LDPC code, the sizes of one supportable code block are as follows.

44, 66, 88, 110, 132, 154, 176, 198, 220, 242, 264, 286, 308, 330, 352, 296, 440, 484, 528, 572, 616, 660, 704, 792, 880, 968, 1056, 1144, 1232, 1320, 1408, 1584, 1760, 1936, 2112, 2288, 2464, 2640, 2816, 3168, 3520, 3872, 4224, 4576, 4928, 5280, 5632, 6336, 7040, 7744, 8448

However, the number of information bits for channel coding using BG #2 can be any natural number.

A total of M maximum exponential matrices $E(H_s)_i^1$ are additionally defined on the basis of the first base graph of the LDPC code (BG #1). In general, M may have a value of 8 or a random natural value, and i has a value from 1 to M. The terminal performs downlink data decoding or uplink data encoding using the matrices $E(H_s)_i^1$. The matrices $E(H_s)_i^1$ have particular element values shifted from the first base graph BG #1 of the LDPC code. That is, the matrices $E(H_s)_i^1$ may be shifted by different values.

One code block size supportable by the first base graph structure of the LDPC code is 10×Z (Z=a×2j and Z is as shown in [Table 4] below. The maximum size of one supportable code block is 2560 (or 3840) and the minimum size of one supportable code block is 20. For reference, some or all of (288, 272, 304, 320, 336, 352, 368, 384) may be additionally reflected as candidates of Z in [Table 3]).

TABLE 4

| | | | | | a | | | |
|---|---|---|---|---|---|---|---|---|
| Z | | 2 | 3 | 5 | 7 | 9 | 11 | 13 | 15 |
| j | 0 | 2 | 3 | 5 | 7 | 9 | 11 | 13 | 15 |
| | 1 | 4 | 6 | 10 | 14 | 18 | 22 | 26 | 30 |
| | 2 | 8 | 12 | 20 | 28 | 36 | 44 | 52 | 60 |
| | 3 | 16 | 24 | 40 | 56 | 72 | 88 | 104 | 120 |
| | 4 | 32 | 48 | 80 | 112 | 144 | 176 | 208 | 240 |
| | 5 | 64 | 96 | 160 | 224 | 288 | 352 | | |
| | 6 | 128 | 192 | 320 | | | | | |
| | 7 | 256 | 384 | | | | | | |

In the second base graph structure of the LDPC code, the sizes of one supportable code block are as follows.

20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040, 1120, 1200, 1280, 1440, 1600, 1760, 1920, 2080, 2240, 2400, 2560, 2880, 3200, 3520, 3840

However, the number of information bits for channel coding using BG #2 can be any natural number.

A total of M maximum exponential matrices $E(H_s)_i^2$ are additionally defined on the basis of the second base graph (BG #2) of the LDPC code. In general, M may have a value of 8 or a random natural value, and i has a value from 1 to M. The terminal performs downlink data decoding or uplink data encoding using the matrices $E(H_s)_i^2$. The matrices $E(H_s)_i^2$ have particular element values shifted in the second base graph (BG #2) of the LDPC code. That is, the matrices $E(H_s)_i^2$ may be shifted by different values.

As described above, the two base-graphs are provided in the next-generation mobile communication system. Accordingly, particular terminals may support only the first base-graph, only the second base-graph, or both base-graphs. They are listed as shown in [Table 5] below.

TABLE 5

| Terminal type | Supportable operation |
|---|---|
| Type 1 | Support only first base-graph or support only maximum exponential matrix $E(H_S)_i^1$ |
| Type 2 | Support only second base-graph or support only maximum exponential matrix $E(H_S)_i^2$ |
| Type 3 | Support both the base-graphs or support both the maximum exponential matrices $E(H_S)_i^1$ and $E(H_S)_i^2$ |

When receiving downlink data information from the base station through downlink control information, the terminal supporting type 1 determines that the first base-graph is always applied as a base-graph applied to a transport block containing the downlink data information and applies the maximum exponential matrix $E(H_s)_i^1$ to data encoding or decoding. When receiving downlink data information from the base station through downlink control information, the terminal supporting type 2 determines that the first base-graph is always applied as a base-graph applied to a transport block containing the downlink data information and applies the maximum exponential matrix $E(H_s)_i^2$ to data encoding or decoding.

When receiving downlink data information through downlink control information from the base station, the terminal supporting type 3 receives, in advance, the configuration of a base graph applied to a transport block containing the downlink data information from the base station through higher-layer signaling such as SIB, RRC, or MAC CE or through downlink control information transmitted in a UE-group-common, UE (cell)-common or UE-specific control channel. Transport block scheduling information may or may not be included in the downlink control information.

Alternatively, when receiving downlink data information through downlink control information from the base station, the terminal supporting type 3 receives in advance a configuration indicating which maximum exponential matrix $E(H_s)_i^1$ or $E(H_s)_i^2$ is applied to a transport block containing the downlink data information from the base station through higher-layer signaling such as SIB, RRC, or MAC CE or through downlink control information transmitted in a UE-group-common, UE (cell)-common or UE-specific control channel. Transport block scheduling information may or may not be included in the downlink control information.

Figure 4:
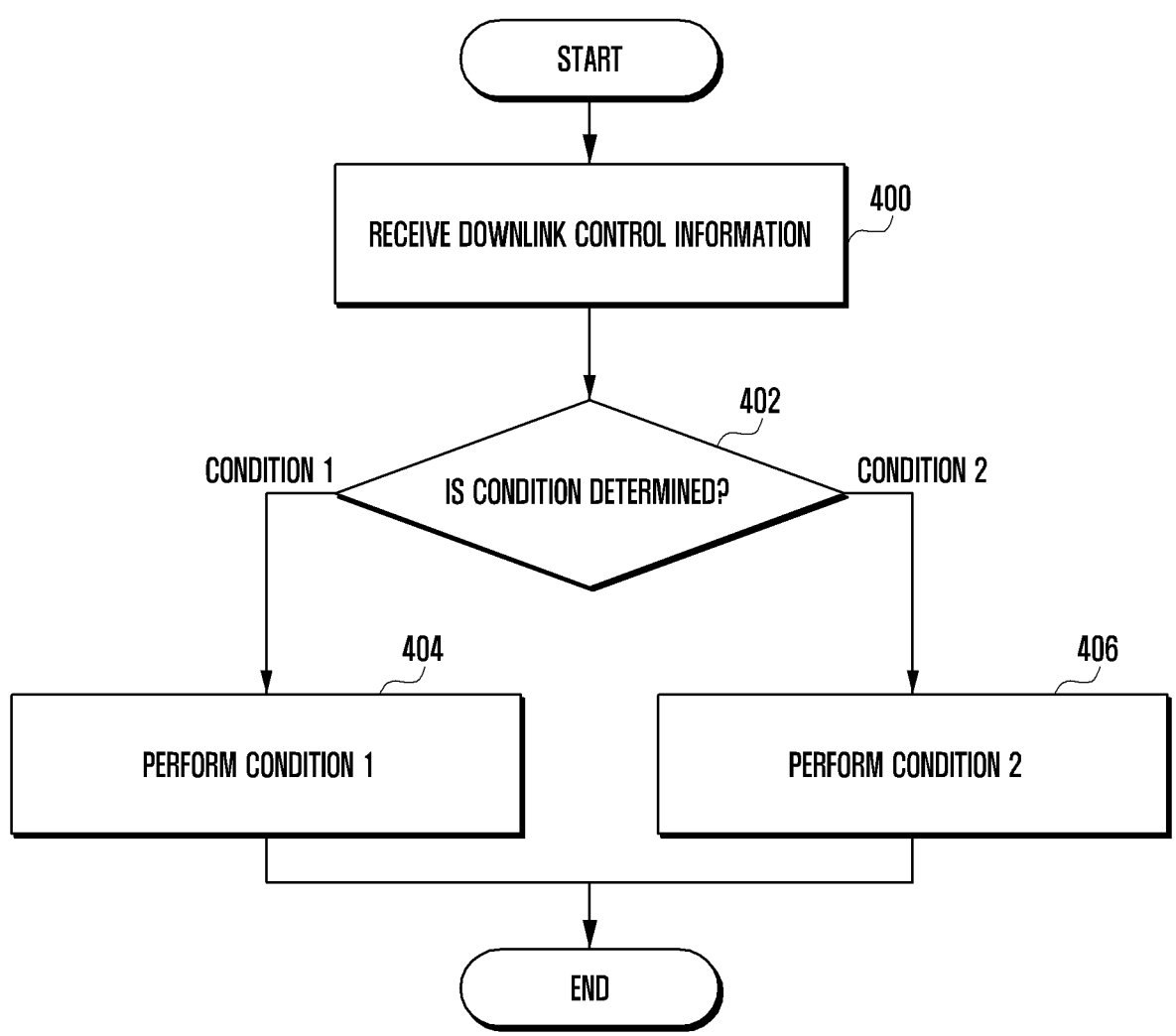
FIG. 4 is a block diagram illustrating a reception process of a terminal.

FIG. 4 is a block diagram illustrating a reception process of the terminal according to an embodiment.

In FIG. 4, the terminal receives downlink control information through a UE (cell)-common downlink control channel, a UE-group-common downlink control channel, or a UE-specific downlink control channel in step 400.

The terminal determines one or more combinations of the following conditions through reception of the downlink control information in step 402.

A. An RNTI scrambled in CRC of the downlink control information

B. The size of a transport block included in the downlink control information

C. A base-graph indication included in the downlink control information

D. A scheduling-related value included in the downlink control information

If the RNTI scrambled in the CRC of the downlink control information, which corresponds to condition A, is an RA-RNTI, a P-RNTI, an SI-RNTI, an SC-RNTI, or a G-RNTI, the terminal determines condition 1 and performs operation 1 in step 404.

If the RNTI scrambled in the CRC of the downlink control information, which corresponds to condition A, is an RA-RNTI, a P-RNTI, an SI-RNTI, an SC-RNTI, or a G-RNTI, the terminal determines condition 2 and performs operation 2 in step 406.

If the size including the transport block included in the downlink control information and the CRC, which corresponds to condition B, is larger than or equal to a predetermined threshold value ($\Delta 1$), the terminal determines condition 1 and performs operation 1 in step 404.

If the size including the transport block included in the downlink control information and the CRC, which corresponds to condition B, is equal to or smaller than a predetermined threshold value ($\Delta 2$), the terminal determines condition 2 and performs operation 2 in step 406.

The threshold value ($\Delta 1$) or the threshold value ($\Delta 2$) may be a fixed value such as 2560 (or 3840, 960, 1040, 1120, 170, 640, or another predetermined value). The threshold value ($\Delta 1$) or the threshold value ($\Delta 2$) may have values which are the same as or different from each other.

Alternatively, the threshold value ($\Delta 1$) or the threshold value ($\Delta 2$) may be a value configured in advance through higher-layer signaling such as SIB, RRC, or MAC CE or a value configured through downlink control information of a UE-group-common, UE-common, or UE-specific control channel. At this time, before the threshold value ($\Delta$) is configured, a default threshold value ($\Delta$) may use a value fixed to 2560 (or 3840, 960, 1040, 1120, 170, 640, or another value). The determination of the time point before the threshold value ($\Delta 1$) or the threshold value ($\Delta 2$) is configured is made when the terminal scrambles CRC of downlink control information with an RA-RANTI, a P-RNTI, an SI-RNTI, an SC-RNTI, or a G-RNTI.

If the size of the transport block included in the downlink control information, which corresponds to condition B, and the CRC is smaller than 2560 (or 3840) (and larger than 160 or 640) and if a minimum code block length (Kmin) among code block lengths (K) supportable by the first base-graph that satisfies K>(transport block size+CRC size) and code block lengths (K) supportable by the second base-graph belongs to the first base-graph, the terminal determines condition 1 and performs operation 1 in step 404.

If the size of the transport block included in the downlink control information, which corresponds to condition B, and the CRC is smaller than 2560 (or 3840) (and larger than 160 or 640) and if a minimum code block length among code block lengths (K) supportable by the first base-graph that satisfies K>(transport block size+CRC size) and code block lengths (K) supportable by the second base-graph belongs to the second base-graph, the terminal determines condition 2 and performs operation 2 in step 406.

This may be expressed using the following equation.

$$(TB+CRC) \leq K \leq V2 \text{ where } K \in K1 \text{ or } K \in K2$$

$$K^* = \min(K)$$

If $K^* \in K1$, condition 1 is satisfied and operation 1 is performed in step 404

If $K^* \in K2$, condition 2 is satisfied and operation 2 is performed in step 406

K denotes a code block length, K* denotes a selected code block length, TB denotes a transport block size, CRC denotes a CRC size, K1 denotes a set of code block lengths supportable by the first base-graph, and K2 denotes a set of code block lengths supportable by the second base-graph.

Alternatively, the above may be expressed using the following equation.

$$V1 \leq (TB+CRC) \leq K \leq V2 \text{ where } K \in K1 \text{ or } K \in K2$$

$$K^* = \min(K)$$

If $K^* \in K1$, condition 1 is satisfied, and operation 1 is performed in step 404.

If $K^* \in K2$, condition 2 is satisfied, and operation 2 is performed in step 406.

K denotes a code block length, K* denotes a selected code block length, TB denotes a transport block size, CRC denotes a CRC size, K1 denotes a set of code block lengths supportable by the first base-graph, and K2 denotes a set of code block lengths supportable by the second base-graph.

K1 is a set of code block lengths supportable by the first base-graph (or the maximum exponential matrix $E(H_s)_i^1$), and the types of the sets may be one or a combination of two or more of the following values. V1 may be 160, 640, or another value. V2 may be 2560, 3840, 960, 1040, 1120, or another value.

Alternatively, if TB+CRC is smaller than V1 in the above equation, decoding or encoding can be performed by applying one of the maximum exponential matrices $E(H_s)_i^2$. If TB+CRC is larger than V2 in the above equation, decoding or encoding can be performed by applying one of the maximum exponential matrices $E(H_s)_i^1$.

1. The case in which K is equal to or smaller than 2560
   44, 66, 88, 132, 154, 176, 198, 242, 264, 286, 308, 330, 352, 296, 484, 528, 572, 616, 660, 704, 792, 968, 1056, 1144, 1232, 1320, 1408, 1584, 1936, 2112, 2288, 2464
2. The case in which K is equal to or smaller than 3840
   44, 66, 88, 132, 154, 176, 198, 242, 264, 286, 308, 330, 352, 296, 484, 528, 572, 616, 660, 704, 792, 968, 1056, 1144, 1232, 1320, 1408, 1584, 1936, 2112, 2288, 2464, 2640, 2816, 3168
3. The case in which K is equal to or smaller than 960
   44, 66, 88, 132, 154, 176, 198, 242, 264, 286, 308, 330, 352, 296, 484, 528, 572, 616, 660, 704, 792
4. The case in which K is equal to or smaller than 1040
   44, 66, 88, 132, 154, 176, 198, 242, 264, 286, 308, 330, 352, 296, 484, 528, 572, 616, 660, 704, 792, 968
5. The case in which K is equal to or smaller than 1120
   44, 66, 88, 132, 154, 176, 198, 242, 264, 286, 308, 330, 352, 296, 484, 528, 572, 616, 660, 704, 792, 968, 1056

If the values in the table are equal to or smaller than M, all or some of the values can be generally used while being omitted from the table. 160, 640, or another value may be selected as M.

K2 is a set of code block lengths supportable by the second base-graph (or the maximum exponential matrix $E(H_s)_i^2$), and types of the sets may be one or a combination of two or more of the following values.

1. The case in which K is equal to or smaller than 2560
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040, 1120, 1200, 1280, 1440, 1600, 1760, 1920, 2080, 2240, 2400, 2560
2. The case in which K is equal to or smaller than 3840
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040, 1120, 1200, 1280, 1440, 1600, 1760, 1920, 2080, 2240, 2400, 2560, (2720, 2880, 3040, 3200, 3360, 3520, 3680, 3840)
3. The case in which K is equal to or smaller than 960
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960
4. The case in which K is equal to or smaller than 1040
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040
5. The case in which K is equal to or smaller than 1120
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040, 1120

If the base-graph indication included in the downlink control information, which corresponds to condition C, indicates 0 (or 1), the terminal determines that condition 1 is satisfied, and performs operation 1 in step 404.

If the base-graph indication included in the downlink control information, which corresponds to condition C, indicates 1 (or 0), the terminal determines that condition 2 is satisfied, and performs operation 2 in step 404.

If MCS, RV, NDI, or frequency or time resource allocation values among the scheduling-related values included in the downlink control information, which correspond to condition D, indicate specific information, the terminal determines that condition 1 is satisfied, and performs operation 1 in step 404.

If MCS, RV, NDI, or frequency or time resource allocation values, among the scheduling-related values included in the downlink control information, which correspond to condition D, indicate specific information, the terminal determines that condition 2 is satisfied, and performs operation 2 in step 404.

When operation 1 is performed, the terminal performs the operation according to one or a combination of two or more of the following.

1. The terminal attempts decoding on a transport block indicated by the downlink control information on the basis of code block lengths supportable by the first base-graph (or the maximum exponential matrix $E(H_s)_i^2$).
2. The terminal attempts decoding on a transport block indicated by the downlink control information with reference to the following supportable code block table.
   44, 66, 88, 110, 132, 154, 176, 198, 220, 242, 264, 286, 308, 330, 352, 296, 440, 484, 528, 572, 616, 660, 704, 792, 880, 968, 1056, 1144, 1232, 1320, 1408, 1584, 1760, 1936, 2112, 2288, 2464, 2640, 2816, 3168, 3520, 3872, 4224, 4576, 4928, 5280, 5632, 6336, 7040, 7744, 8448, (5984, 6688, 7392, 8096)
3. One or combinations of two or more of the following available code block sets correspond to code blocks that the terminal encodes or decodes using $E(H_S)_1^1$. For the corresponding code blocks, the terminal at least attempts decoding on a transport block indicated by the downlink control information on the basis of the matrix $E(H_S)_1^1$ supported by the first base-graph.
   A. 44, 88, 176, 352, 704, 1408, 2816, 5632
   B. 44, 66, 110, 154, 198, 242, 286, 330
   C. 44, 66, 154, 198, 242, 286, 330
4. One or combinations of two or more of the following available code block sets correspond to code blocks that the terminal encodes or decodes using $E(H_S)_2^1$. For the corresponding code blocks, the terminal at least attempts decoding on the transport block indicated by the downlink control information on the basis of the matrix E(Hs) supported by the first base-graph.
   A. 66, 132, 264, 528, 1056, 2112, 4224, 8448
   B. 88, 132, 220, 308, 396, 484, 572, 660
   C. 88, 132, 308, 396, 484, 572, 660
5. One or combinations of two or more of the following available code block sets correspond to code blocks that the terminal encodes or decodes using $E(H_S)_3^1$. For the corresponding code blocks, the terminal at least attempts decoding on a transport block indicated by the downlink control information on the basis of the matrix $E(H_S)_3^1$ supported by the first base-graph.
   A. 110, 220, 440, 880, 1760, 3520, 7040
   B. 176, 264, 440, 616, 792, 968, 1144, 1320
   C. 1760, 3520, 7040
   D. 3520, 7040
   E. 7040
   F. 176, 264, 616, 792, 968, 1144, 1320
6. One or combinations of two or more of the following available code block sets correspond to code blocks that the terminal encodes or decodes using $E(H_S)_4^1$. For the corresponding code blocks, the terminal at least attempts decoding on a transport block indicated by the downlink control information on the basis of the matrix $E(H_S)_4^1$ supported by the first base-graph.
   A. 154, 308, 616, 1232, 2464, 4928
   B. 352, 528, 880, 1232, 1584, 1936, 2288, 2640
   C. 352, 528, 1232, 1584, 1936, 2288, 2640
7. One or combinations of two or more of the following available code block sets correspond to code blocks that the terminal encodes or decodes using $E(H_S)_5^1$. For the corresponding code blocks, the terminal at least attempts decoding on a transport block indicated by the downlink control information on the basis of the matrix $E(H_S)_5^1$ supported by the first base-graph.
   A. 198, 396, 792, 1584, 3168, 6336
   B. 704, 1056, 1760, 2464, 3168, 3872, 4576, 5280
   C. 704, 1056, 2464, 3168, 3872, 4576, 5280
   8. One or combinations of two or more of the following available code block sets correspond to code blocks that the terminal encodes or decodes using $E(H_S)_6^1$. For the corresponding code blocks, the terminal at least attempts decoding on a transport block indicated by the downlink control information on the basis of the matrix $E(H_S)_6^1$ supported by the first base-graph.
   A. 242, 484, 968, 1936, 3872
   B. 1408, 2112, 3520, 4928, 6336, 7744
   C. 1408, 2112, 4928, 6336, 7744

The LDPC code is a type of linear block code and includes a process of determining a codeword that satisfies a condition such as [Equation 1] below.

9. One or combinations of two or more of the following available code block sets correspond to code blocks that the terminal encodes or decodes using $E(H_S)_7^1$. For the corresponding code blocks, the terminal at least attempts decoding on a transport block indicated by the downlink control information on the basis of the matrix $E(H_S)_7^1$ supported by the first base-graph.
   A. 286, 572, 1144, 2288, 4576
   B. 2816, 4224, 7040
   10. One or combinations of two or more of the following available code block sets correspond to code blocks that the terminal encodes or decodes using $E(H_S)_8^1$. For the corresponding code blocks, the terminal at least attempts decoding on a transport block indicated by the downlink control information on the basis of the matrix $E(H_S)_8^1$ supported by the first base-graph.
   A. 330, 660, 1320, 2640, 5280
   B. 5632, 8448

When operation 2 is performed, the terminal performs one or a combination of two or more of the operations.

1. The terminal attempts decoding on the transport block indicated by the downlink control information on the basis of code block lengths supportable by the second base-graph.
   2. The terminal attempts decoding on the transport block indicated by the downlink control information with reference to the following supportable code block table.
   20, 30, 40, 50, 60, 70, 80, 90, 100, 110, 120, 130, 140, 150, 160, 180, 200, 220, 240, 260, 280, 300, 320, 360, 400, 440, 480, 520, 560, 600, 640, 720, 800, 880, 960, 1040, 1120, 1200, 1280, 1440, 1600, 1760, 1920, 2080, 2240, 2400, 2560 (2880, 3200, 3520, 3840, 2720, 3040, 3360, 3680)
   3. One or combinations of two or more of the following available code block sets correspond to code blocks that the terminal encodes or decodes using $E(H_S)_1^2$. For the corresponding code blocks, the terminal at least attempts decoding on the transport block indicated by the downlink control information on the basis of the matrix $E(H_S)_1^2$ supported by the second base-graph.
   A. 20, 40, 80, 160, 320, 640, 1280
   B. 20, 30, 50, 70, 90, 110, 130, 150
   4. One or combinations of two or more of the following available code block sets correspond to code blocks that the terminal encodes or decodes using $E(H_S)_2^2$ For the corresponding code blocks, the terminal at least attempts decoding on a transport block indicated by the downlink control information on the basis of the matrix $E(H_S)_2^2$ supported by the second base-graph.
   A. 30, 60, 120, 240, 480, 960, 1920, (3840)
   B. 40, 60, 100, 140, 180, 220, 260, 300
   5. One or combinations of two or more of the following available code block sets correspond to code blocks that the terminal encodes or decodes using $E(H_S)_3^2$. For the corresponding code blocks, the terminal at least attempts decoding on a transport block indicated by the downlink control information on the basis of the matrix $E(H_S)_3^2$ supported by the second base-graph.
   A. 50, 100, 200, 400, 800, 1600, (3200)
   B. 80, 120, 200, 280, 360, 440, 520, 600
   6. One or combinations of two or more of the following available code block sets correspond to code blocks that the terminal encodes or decodes using $E(H_S)_4^2$. For the corresponding code blocks, the terminal at least attempts decoding on a transport block indicated by the downlink control information on the basis of the matrix $E(H_S)_4^2$ supported by the second base-graph.
   A. 70, 140, 280, 560, 1120, 2240
   B. 160, 240, 400, 560, 720, 880, 1040, 1200
   7. One or combinations of two or more of the following available code block sets correspond to code blocks that the terminal encodes or decodes using $E(H_S)_5^2$. For the corresponding code blocks, the terminal at least attempts decoding on a transport block indicated by the downlink control information on the basis of the matrix $E(H_S)_5^2$ supported by the second base-graph.
   A. 90, 180, 360, 720, 1440, (2880)
   B. 320, 480, 800, 1120, 1440, 1760, 2080, 2400
   8. One or combinations of two or more of the following available code block sets correspond to code blocks that the terminal encodes or decodes using $E(H_S)_6^2$. For the corresponding code blocks, the terminal at least attempts decoding on a transport block indicated by the downlink control information on the basis of the matrix $E(H_S)_6^2$ supported by the second base-graph.
   A. 110, 220, 440, 880, 1760, (3520)
   B. 640, 960, 1600, 2240, (2880), (3520)
   9. One or combinations of two or more of the following available code block sets correspond to code blocks that the terminal encodes or decodes using $E(H_S)_7^2$. For the corresponding code blocks, the terminal at least attempts decoding on a transport block indicated by the downlink control information on the basis of the matrix $E(H_S)_7^2$ supported by the first base-graph.
   A. 130, 260, 520, 1040, 2080
   B. 1280, 1920, (3200)
   10. One or combinations of two or more of the following available code block sets correspond to code blocks that the terminal encodes or decodes using $E(H_S)_8^2$. For the corresponding code blocks, the terminal at least attempts decoding on a transport block indicated by the downlink control information on the basis of the matrix $E(H_S)_8^2$ supported by the second base-graph.
   A. 150, 300, 600, 1200, 2400
   B. 2560, (3840)

In the disclosure, a number in brackets means that the corresponding value may or may not be included.

In the disclosure, an information bit may refer to the amount of data or a transport block size (TBS) to be transmitted from a higher layer. The TBS is generally transmitted within one TTI, but can be transmitted over a plurality of TTIs. In the disclosure, the TBS is indicated by N.

In the disclosure, a first terminal may be a terminal receiving a configuration of decoding using a maximum exponential matrix $E(H_s)_i^1$ in data transmission, a terminal which cannot perform decoding using a maximum exponential matrix $E(H_s)_i^2$ in data transmission, or a terminal supporting type 1 in [Table 5] above.

In the disclosure, a second terminal may be a terminal receiving a configuration of decoding using a maximum exponential matrix $E(H_s)_i^2$ in data transmission, a terminal which cannot perform decoding using a maximum exponential matrix $E(H_s)_i^1$ in data transmission, or a terminal supporting type 2 in [Table 5] above.

In the disclosure, a third terminal may be a terminal receiving a configuration of decoding using a maximum exponential matrix $E(H_s)_i^1$ or $E(H_s)_i^2$ in data transmission or a terminal supporting type 3 in [Table 5] above. The terminal may determine which maximum exponential matrix is used according to one or more of the TBS, the MCS, and the transmission mode.

In the disclosure, for values in brackets shown in a table, some or all of the values may be included in the table or may not be included therein.

Figure 5:
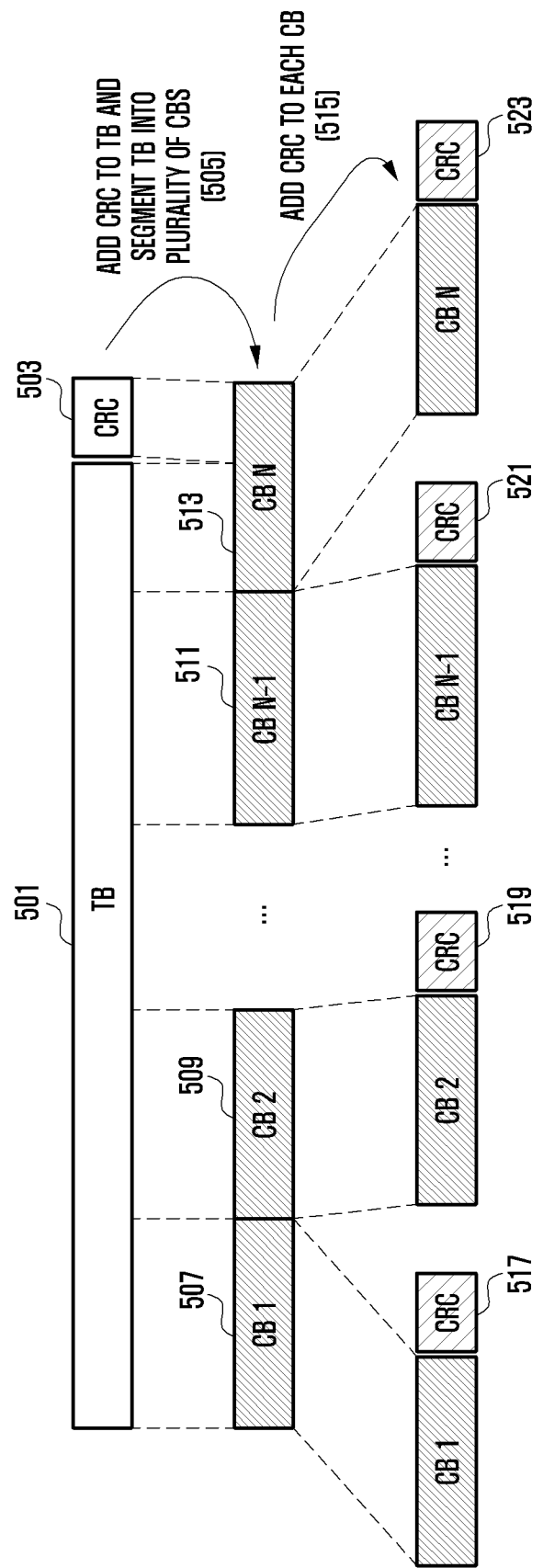
FIG. 5 illustrates a method of segmenting a transport block (TB) into code blocks (CBs)

FIG. 5 illustrates a method of segmenting one transport block (TB) into one or more code blocks (CBs). Referring to FIG. 5, one transport block 501 to be transmitted in the uplink or downlink may have a CRC 503 added to the last or first part thereof. The CRC may have 16 bits, 24 bits, or a prefixed number of bits, or may have a variable number of bits according to a channel condition, and may be used to determine whether channel coding is successful. Blocks 501 and 503 to which the TB and the CRC are added may be segmented into a plurality of code blocks 507, 509, 511, and 513 as indicated by reference numeral 505. The segmentation of the code blocks may be performed with a predetermined maximum size, in which case the last code block 513 may be smaller than other code blocks, or may have the same size as other code blocks by inserting 0, a random value, or 1. CRCs 517, 519, 521, and 523 may be added to the respective segmented code blocks, as indicated by 515. The CRC may have 16 bits, 24 bits, or a prefixed number of bits, or a variable number of bits according to a channel condition, and may be used to determine whether channel coding is successful. However, the CRC 503 added to the TB and the CRCs 517, 519, 521, and 523 added to the segmented code blocks may have variable lengths depending on the type of the channel code to be applied to the code block. Further, the CRC may be added or omitted when a polar code is used. In the segmentation process, if the number of CBs is one, the CRC 517 added to the CB may be omitted.

The length of the CRC inserted for TB transmission, which is used for determining whether TB decoding is successful after the receiver performs TB decoding, is L, and L may have at least two available values. That is, if the transport block is segmented into two or more code blocks and transmitted, a long CRC may be used. On the other hand, if the transport block is segmented into one code block and transmitted, a short CRC may be used. If the LDPC code is used for encoding in the mobile communication system, the LDPC code itself has a parity check function, and thus may have, to some extent, a function of determining whether decoding is successful without CRC insertion. If the LDPC code is used and it is desired to acquire an additional decoding success determination level in a specific mobile communication system, technology for determining whether decoding is finally successful by additionally inserting the CRC to the parity check function of the LDPC code may be used, and thus the error rate level of the determination of whether decoding is successful, desired by the system, can be obtained. For example, if the error rate of determination about whether decoding is successful required by the system is 10−6 and the error rate of determination acquired by the parity check function of the LDPC code is 10−3, the final system determination error rate of 10−6 may be achieved by additionally inserting the CRC having the determination error rate of 10−3. In general, as the length of the CRC is longer, the error rate of the determination about whether decoding is successful becomes lower. If the transport block is segmented into two or more code blocks and transmitted, the TB itself is configured through concatenation of LDPC codes and thus cannot use a parity check function of the LDPC code. On the other hand, if the transport block includes one code block, the parity check function of the LDPC code may be used. Accordingly, in a specific system, the TB can be used after a long CRC or a short CRC is inserted into the TB according to the number of code blocks within the transport block. In embodiments of the disclosure, it is assumed that a long length L+ or a short length L− may be used as the length L of the CRC inserted into the TB depending on whether the TB is segmented into two or more code blocks. A value available for L+ may be 24, which is used in the LTE system, and any length shorter than 24 may be used for L−, and 16, which is used by the control channel of the LTE system, may be reused. However, in embodiments of the disclosure, L− is not limited to 16.

Whether a specific TB is segmented into a plurality of code blocks is determined according to whether the given TB can be transmitted using one code block, so the determination may be performed as follows:

If N+L− is equal to or smaller than the largest available CB length, the TB is transmitted using one code block (If (N+L−)<=Kmax, then one CB is used)

If N+L− is larger than the largest available CB length, the TB is segmented into a plurality of code blocks and transmitted (If (N+L−)>Kmax, then one CB is segmented)

Kmax indicates the largest code block size among available code block sizes.

In the conventional LTE system, an MCS index transmitted through DCI and the number of allocated PRBs are used to determine the TBS. On the basis of the downlink, an MCS index of 5 bits may be transmitted through DCI, and thus a modulation order Qm and a TBS index may be derived from [Table 6] below.

TABLE 6

| MCS Index $I_{MCS}$ | Modulation Order $Q_m$ | TBS Index $I_{TBS}$ |
| --- | --- | --- |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |

TABLE 6-continued

| MCS Index $I_{MCS}$ | Modulation Order $Q_m$ | TBS Index $I_{TBS}$ |
|---|---|---|
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | reserved |
| 30 | 4 | |
| 31 | 6 | |

The number of PRBs used for data transmission may be known from resource allocation information transmitted through DCI, and the TBS may be determined on the basis of the TBS index known from the above table and [Table 7] below.

TABLE 7

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |

[Table 7] above is a TBS table in the case in which the number of PRBs is from 1 to 10 and the TBS index is from 0 to 26, but may be used in conventional LTE even when the number of PRBs is up to 110 and additional TBS indexes are used. A number in a space corresponding to the number of allocated PRBs and the TBS index in [Table 7] above is a TBS understood by the base station and the terminal.

In the conventional LTE system, a turbo code is used for channel coding in data transmission, and a code rate of the turbo code is 1/3. If the number of information bits input into the turbo code is $K_\pi$, the number of coded bits resulting from execution of the turbo code is $3K_\pi$. Accordingly, when rate matching is performed for data transmission, the length of the circular buffer that is used may be $K_w = 3K_\pi$. Rate matching is a process of determining bits to be mapped and transmitted when mapping encoded bits to actual physical resources. In the case of downlink in which the base station transmits data, the terminal needs a soft buffer memory having a size sufficient to store a log likelihood ratio (LLR) value of $K_w = 3K_\pi$ corresponding to the transmitted bits. The LLR value may be a value obtained by processing received data to perform decoding. However, a large soft buffer is needed for transmission of large data, which causes an increase in terminal costs. This is because a larger memory is required. Accordingly, a rate-matching method to store LLR values even in a small soft buffer memory when large data is transmitted may be needed. In the conventional LTE system, the size of the circular buffer for performing rate matching in one code block is $$N_{cb} = \min\left(\left\lfloor \frac{N_{IR}}{C} \right\rfloor, K_w\right),$$

where $N_{IR}$ may be determined by a parameter such as the size $N_{soft}$ of the soft buffer of the terminal and the number of HARQ processes. $N_{soft}$ may be defined in a UE category.

C denotes the number of code blocks included in a data transport block to be transmitted.

Figure 6:
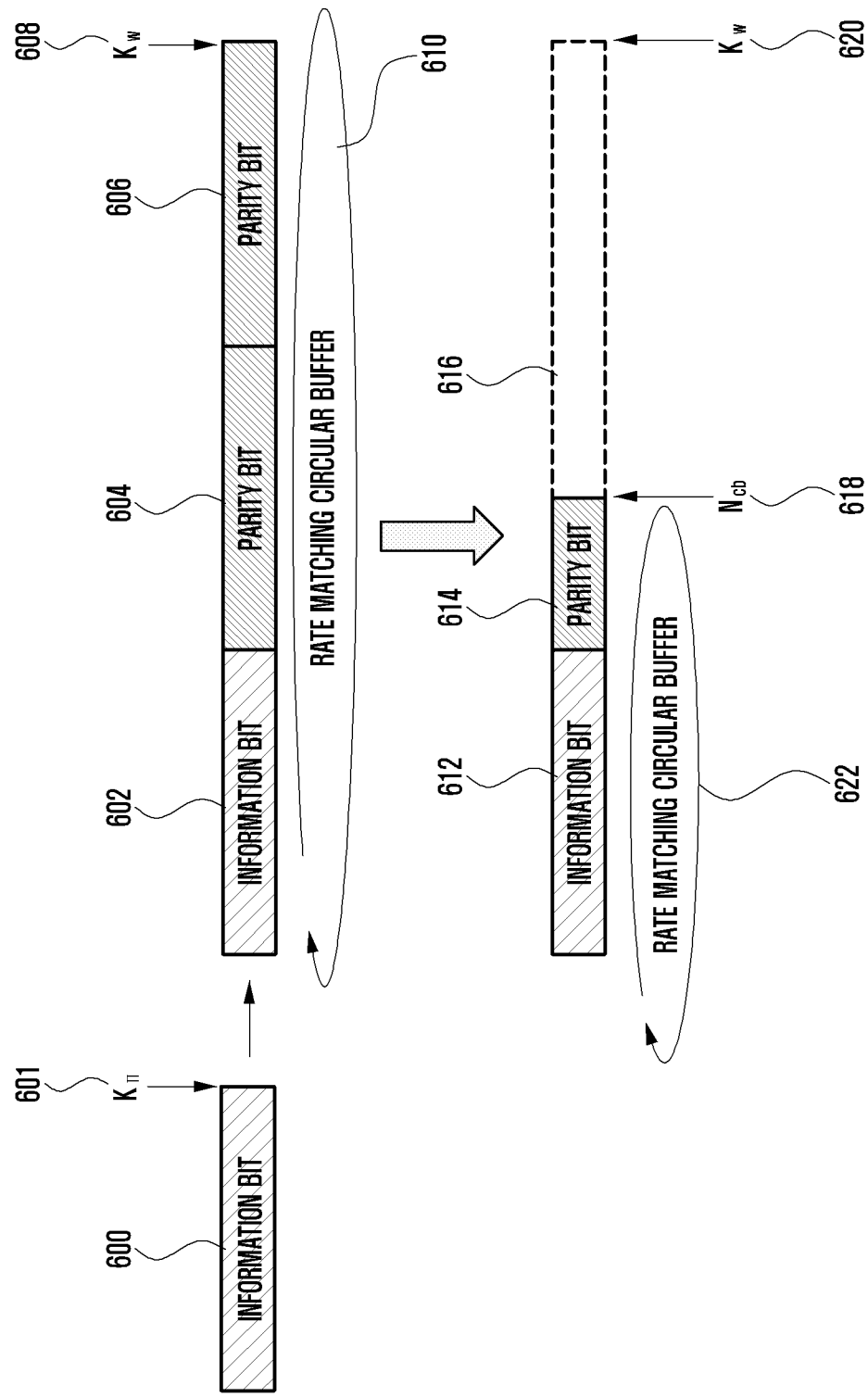
FIG. 6 illustrates a rate-matching method after channel coding and restrictions on rate matching.

FIG. 6 illustrates an example in which a rate-matching method varies depending on the size of the soft buffer of the terminal. If data having the size $K_\pi$ 601 to be transmitted is encoded with a turbo code as indicated by reference numeral 600, an information bit 602, a first parity bit 604, and a second parity bit 606 may be generated, and the total size thereof may be $K_W$, as indicated by reference numeral 608. A process of sequentially mapping the bits 602, 604, and 604 having the determined size $K_W$ to allocated resources and transmitting the same is performed in step 610 corresponding to rate matching. However, if restrictions are added to rate matching in consideration of the size of the soft buffer of the terminal, the rate matching may be performed using only a data bit 612 and some parity bits 614 in step 622. The size of the circular buffer is $N_{cb}$, as indicated by reference numeral 618, which is influenced by $N_{IR}$, determined by the size of the soft buffer of the terminal and the number of HARQ processes. Since parity bits corresponding to reference number 616 cannot be stored by the terminal due to $N_{IR}$, the parity bits may be bits that are not transmitted. This is because the bits that the terminal cannot store are not transmitted.

In the disclosure, the downlink data transmission of the terminal may be sufficiently applied to a process of encoding a transport block of a TBS uplink data channel.

The encoding/decoding operation of the terminal described in the disclosure can be sufficiently applied to the encoding/decoding operation of the base station.

In the disclosure, the length of the CRC inserted for TB transmission, used to determine whether TB decoding is successful after the receiver performs TB decoding, may have at least two values. That is, if the transport block is segmented into two or more code blocks and transmitted, a long CRC (L+) may be used. On the other hand, if the transport block is segmented into one code block and transmitted, a short CRC (L−) may be used. L− is a natural number smaller than L+. In embodiments of the disclosure, it is assumed that a long length L+ or a short length L− may be used as the length of the CRC inserted into the TB depending on whether the TB is segmented into two or more code blocks. The value available for L+ may be 24, which is used in the LTE system, and any length shorter than 24 may be used for L− and 16, which is used by the control channel of the LTE system, may be reused. However, in embodiments of the disclosure, L− is not limited to 16.

In the disclosure, a transport block (TB) may be data transmitted from a higher layer to a physical layer and a unit used in initial transmission of the physical layer.

In the disclosure, N1_max and N2_max may indicate a maximum code block (CB) length when BG #1 is used in the LDPC code and a maximum code block length when BG #2 is used. For example, N1_max=8448 and N2_max=3840. However, embodiments of the disclosure are not limited thereto. In the disclosure, N1_max may be interchangeably used with N1max or N1,max, and N2_max may be interchangeably used with N2max or N2,max.

In the disclosure, L_{TB,16} and L_{TB,24} may be lengths of CRCs added to the TB, and L_(TB,16)<L_{TB,24}. For example, L_{TB,16} may be 16, and L_{TB,24} may be 24. In the disclosure, L_{TB,16} may be interchangeably used with LTB,16, and L_{TB,24} may be interchangeably used with LTB,24. In the disclosure, L_{CB} may be a length of the CRC added to the CB and may be interchangeably used with LCB.

Embodiment 1

[Embodiment 1] provides a TBS determination method in consideration of the maximum TBS supported by the terminal. The embodiment may be applied to the specific case in which a TB is segmented into two or more code blocks when the TBS is large and each code block is channel-coded to an LDPC code using BG #2. That is, the embodiment may be applied to the case in which transmission can be performed using BG #2 even when the TBS is large. In the embodiment, R_1 and R_2 may indicate code rates, which are references for selecting BG #1 or BG #2 of the LDPC and may be interchangeably used with R1 and R2. For example, R1=1/4 and R2=2/3, but the method provided by the disclosure is not limited thereto. Further, in the disclosure, R, referring to the code rate, R1, and R2 may be expressed and determined in various ways, such as in the form of a fraction or a decimal. When a BG is selected between BG #1 and BG #2 in data transmission, a code rate and a soft buffer of the terminal may be considered.

The base station may transmit data by allocating frequency resources of a predetermined number of PRBs and time resources of a predetermined number of slots or symbols to the terminal, and scheduling information related thereto may be transmitted to the terminal through downlink control information (DCI), configuration transmitted through higher-layer signaling, or a combination thereof. When scheduling information of the base station and the terminal is given, the TBS may be determined in the following order.

Step 1-1: determine the number of temporary information bits (A)

Step 1-2: process of determining a number of temporary CBs, performing byte alignment (making A a multiple of 8), and making A a multiple of the number of temporary CBs (C, B)

Step 1-3: process of determining the TBS except for the number of CRC bits (TBS)

Step 1-4: determine a final TBS value in consideration of terminal capability, a terminal category, or the maximum TBS supported by the terminal In Step 1-1, a temporary TBS value is determined in consideration of the number of resource areas to which data to be transmitted can be mapped. The number of temporary information bits may be determined by a combination of one or more of a code rate (R), a modulation order (Qm), the number (#RE) of REs to which rate-matching data is mapped, the number of allocated PRBs or RBs (#PRB), the number of allocated OFDM symbols, the number of allocated slots, and a reference value of the number of mapped REs within one PRB. For example, A may be determined using [Equation 10] below.

$$A = N_{RE} S Q_m S R S v \qquad \text{[Equation 10]}$$

Qm, which is the modulation order, and R, which is the code rate, may be transferred to the terminal while being included in DCI. The number v of layers used for transmission may be transmitted to the terminal through DCI, higher-layer signaling, or a combination thereof. $N_{RE}$ may be determined by the base station using the number of REs to which data is mapped through rate matching when data is transmitted, and may be equally understood by the base station and the terminal if both the base station and the terminal are aware of resource allocation information. When $N_{RE}$ is calculated, data is mapped in a rate-matching manner, but the data is punctured due to a specific reason such as CSI-RS, URLLC, or UCI transmission and thus an RE, which is not actually mapped, is included in $N_{RE}$. This is to make both the base station and the terminal equally understand the TBS even when the base station does not transmit some data scheduled to be mapped in a puncturing scheme without informing the terminal thereof. For example, an MCS table such as [Table 8] may be defined, and information on Qm and R may be transmitted to the terminal through transmission of an MCS index. The modulation order means information such as QPSK, 16 QAM, 64 QAM, 256 QAM, and 1024 QAM.

TABLE 8

| MCS Index | modulation order | Code Rate |
|---|---|---|
| 0 | 2 | 0.1171875 |
| 1 | 2 | 0.15332031 |
| 2 | 2 | 0.18847656 |
| 3 | 2 | 0.24511719 |
| 4 | 2 | 0.30078125 |
| 5 | 2 | 0.37011719 |
| 6 | 2 | 0.43847656 |
| 7 | 2 | 0.51367188 |
| 8 | 2 | 0.58789063 |
| 9 | 2 | 0.66308594 |
| 10 | 4 | 0.33203125 |
| 11 | 4 | 0.36914063 |
| 12 | 4 | 0.42382813 |
| 13 | 4 | 0.47851563 |
| 14 | 4 | 0.54003906 |
| 15 | 4 | 0.6015625 |
| 16 | 4 | 0.64257813 |
| 17 | 6 | 0.42773438 |
| 18 | 6 | 0.45507813 |
| 19 | 6 | 0.50488281 |
| 20 | 6 | 0.55371094 |
| 21 | 6 | 0.6015625 |
| 22 | 6 | 0.65039063 |
| 23 | 6 | 0.70214844 |
| 24 | 6 | 0.75390625 |
| 25 | 6 | 0.80273438 |
| 26 | 6 | 0.85253906 |
| 27 | 6 | 0.88867188 |
| 28 | 6 | 0.92578125 |
| 29 | 2 | N/A |
| 30 | 4 | N/A |
| 31 | 6 | N/A |

In [Table 8] above, Qm and R are transmitted together by an MCS index of 5 bits, but may be transmitted to the terminal in various methods such that Qm and R are transmitted by an MCS index of 6 bits through DCI or such that each of Qm of 3 bits and R of 3 bits uses a bit field. Alternatively, A=(number of allocated PRBs)×(number of reference REs per PRB)×QmSRSv.

Step 1-2 is a step of determining the number C of temporary code blocks (the number of temporary CBs) on the basis of determined A and making A a multiple (B) of both 8 and the number of temporary CBs. This is to make the finally determined TBS and the length of the CRC added to the TB byte-aligned and also a multiple of CBs. First, the number of temporary CBs may be determined by [pseudo-code 1] below.

[pseudo-code 1]
[Start]
If R ≤ R1, then $C = \left\lceil \frac{A}{N_{2,max}} \right\rceil$, Else $C = \left\lceil \frac{A}{N_{1,max}} \right\rceil$.

End if of R
[End]

R denotes a code rate, and may be a value transmitted through DCI as described above. As described above, R1 may be 1/4, $N_{1,max}$ may be 8448, and $N_{2,max}$ may be 3840. In this case, the determination may be made using [pseudo-code 2], but is not limited thereto.

[pseudo-code 2]
[Start]
If R ≤ ¼ , then $C = \left\lceil \frac{A}{3840} \right\rceil$, Else $C = \left\lceil \frac{A}{8448} \right\rceil$.

End if of R
[End]

The determined C may be the number of temporary CBs, and CB segmentation may be performed when the TB is finally transmitted. The number of segmented CBs may be different from the number of actual CBs, but it may be determined that the numbers are the same as each other. A process of generating B by making A determined in step 1-1 a multiple of both 8 and C is performed, which serves to prevent all code blocks from being transmitted with an unnecessary bit or an unnecessary zero-padding bit. B may be calculated using [Equation 15] below.

$$B = \left\lceil \frac{A}{8C} \right\rceil \times 8C \qquad \text{[Equation 15]}$$

[Equation 15] may be transformed to $$B = \left\lfloor \frac{A}{8C} \right\rfloor \times 8C, B = A + (8C - \mod(A, 8C)),$$

or B=A−mod(A,8C) and then applied. In the disclosure, mod(x,y) may be a remainder obtained by dividing x by y, and may be transformed to $x - \lfloor x/y \rfloor \times y$. In the disclosure, (x) is a minimum integer larger than x, and may be interchangeably used with ceil(x). *x+ is a maximum integer smaller than x, and may be interchangeably used with floor(x). [Equation 15] above may be transformed to $$B = \text{Round}\left(\frac{A}{8C}\right) \times 8C$$

and then applied, which may mean that the multiple of 8C closest to A is B. Round(x) may be the integer that is closest to x or a value obtained by rounding off x. [Equation 15] serves to make A a multiple of 8C, but may be transformed to an equation of making A a common multiple or the lowest common multiple of 8 and C and then applied. Accordingly, [Equation 15 above may be transformed to $$B = \left\lceil \frac{A}{LCM(8, C)} \right\rceil \times LCM(8, C), B = \left\lfloor \frac{A}{LCM(8, C)} \right\rfloor \times LCM(8, C),$$

or $$B = \text{Round}\left(\frac{A}{LCM(8, C)}\right) \times LCM(8, C)$$

and then applied. LCM(a b) is the lowest common multiple of a and b.

Steps up to step 1-2 are to obtain information bits transmitted in allocated resources, and step 1-3 is a process of excluding the number of bits added for the CRC from the information bits obtained before. This may be determined using pseudo-code 3].

[pseudo-code 3]

[Start]
If R ≤ R1,
    If B ≤ $N_{2,max}$, then TBS = B − LTB,16
    Else TBS = B − LTB,24 − C× LCB
    End if of B
Else
    If B ≤ $N_{2,max}$, then TBS = B − LTB,16
    Else if B ≤ $N_{1,max}$, then TBS = B − LTB,24
    Else TBS = B − LTB,24 − C× LCB
    End if of B
End if of R
[End]

If the value of each parameter is determined and applied as described above, [pseudo-code 3] can be applied to [pseudo code-4] below but is not limited thereto.

[pseudo-code 4]

[Start]
If R ≤ 1/4,
    If B ≤ 3840, then TBS = B − 16
    Else TBS = B − 24×(C+1)
    End if of B
Else
    If B ≤ 3840, then TBS = B − 16
    Else if B ≤ 8448, then TBS = B − 24
    Else TBS = B − 24×(C+1)
    End if of B
End if of R
[End]

LTB,16 and LTB,24 are considered since the CRC length applied to the TB varies depending on the TBS. If the number of code blocks is 1, the CRC added to the CB may be omitted or the CRC length added to the CB may be 0. In another example, step 1-3 may be transformed to [pseudo-code 5] or [pseudo-code 6] and then applied.

[pseudo-code 5]

[Start]
If B ≤ $N_{2,max}$, then TBS = B − LTB,16
Else TBS = B − LTB,24
End if of B
[End]

[pseudo-code 6]

[Start]
If B ≤ 3840, then TBS = B − 16
Else TBS = B − 24
End if of B
[End]

In [pseudo-code 5] or [pseudo-code 6] above, the CRC length added to the CB is not excluded in order to obtain the final TBS. Accordingly, when actual data is subsequently mapped and transmitted, the CRC length of the CB may be added to the obtained TBS, so that the actual code rate may be larger than R.

Last, in step 1-4, the final TBS is determined in consideration of the maximum TBS supported by the terminal on the basis of the temporary TBS value calculated up to step 1-3. The TBS calculated up to step 1-3 is TBStemp. The maximum TBS supported by the terminal is TBSUE,max in the disclosure. TBSUE,max may be defined differently for each UE category, the terminal may transmit TBSUE,max to the base station with its own capability, the base station may transmit TBSUE,max to the terminal through higher-layer signaling, or TBSUE,max may be determined through a combination of the methods. For example, [Table 9] below is a table defining UE categories, and a value in a column indicated by "Maximum number of bits of a DL-SCH transport block received within a TTT" may be the maximum TBS of one transport block that the terminal can receive.

TABLE 9

| UE Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers, 64QAM) 75376 (2 layers, 64QAM) | 3654144 | 2 or 4 |

The final TBS in step 1-4 may be determined as shown in [Equation 16] below.

$$\text{Final TSB} = \min(\text{TBStemp}, \text{TBSUE,max}) \quad \text{[Equation 16]}$$

In [Equation 16], min(x,y) is the smaller value of x and y. Alternatively, [Equation 16] may be expressed by [pseudo-code 7] below.

---
[pseudo-code 7]
---
[Start]
If TBStemp < TBSUE,max, final TBS = TBStemp
Else final TBS = TBSUE,max
[End]
---

Alternatively, if TBSUE,max is smaller than the TBS through comparison between TBSUE,max and the TBS calculated up to step 1-3, a method of replacing the TBS with a final TBS may be determined.

Figure 7:
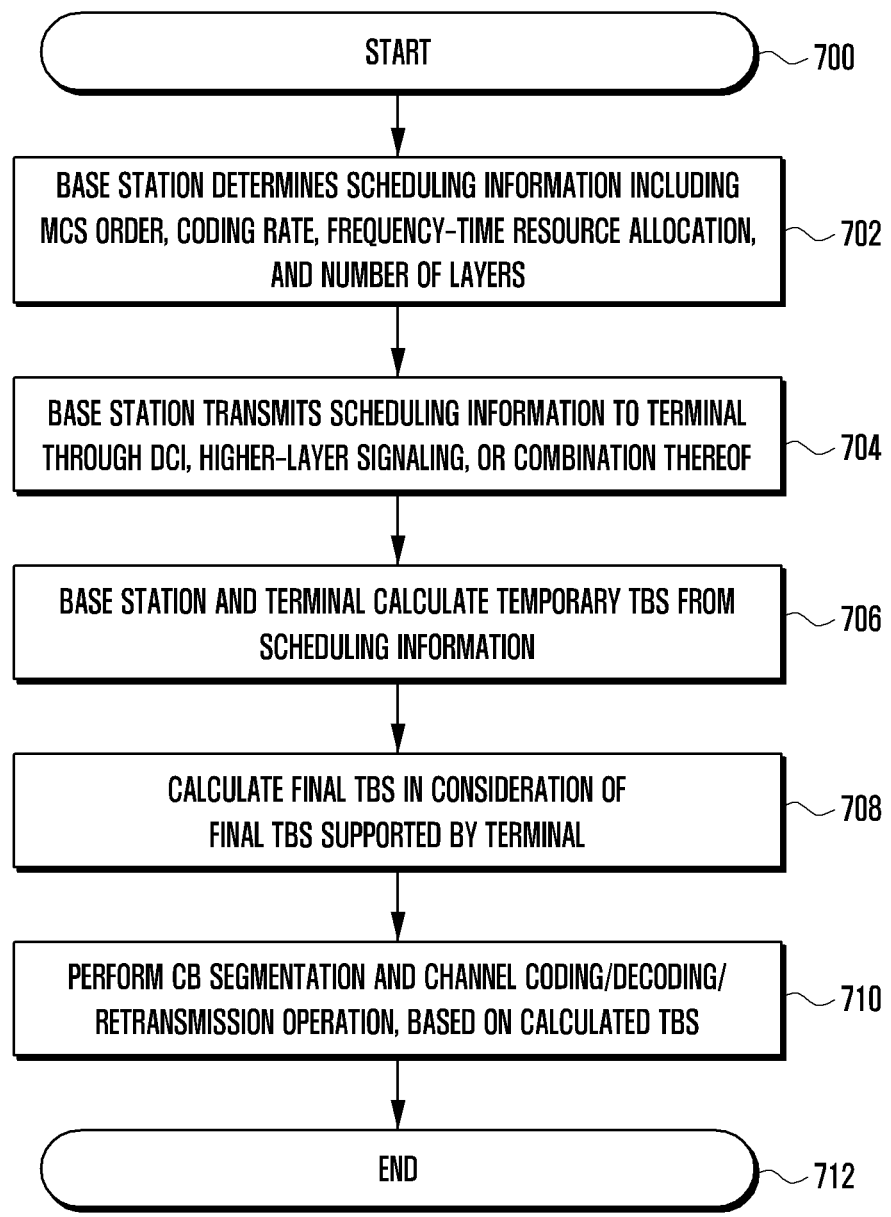
FIG. 7 is a flowchart illustrating the operation of the base station and the terminal according to a first embodiment of the disclosure.

FIG. 7 is a flowchart illustrating a step in which the base station and the terminal obtain the TBS and transmit and receive data when scheduling and transmitting downlink or uplink data. If the scheduling and data transmission process starts in step 700, the base station determines scheduling information in step 702, and transfers the scheduling information through a combination of one or more of DCI, system information, MAC CE, and RRC signaling to the terminal in step 704. The temporary TBS is calculated from the determined scheduling information in step 706. In step 706, the TBS may be calculated using step 1-1, step 1-2, and step 1-3 described above. Step 1-1, step 1-2, and step 1-3 may be combined and performed at the same time, or the order thereof may be changed. The final TBS is determined in consideration of the maximum TBS supported by the terminal on the basis of the calculated temporary TBS in step 708, which corresponds to step 1-4 described above. Thereafter, a CB segmentation and channel coding/decoding/retransmission operation is performed using the calculated TBS in step 710, which completes data scheduling and transmission in step 712.

The TBS determination method provided by the embodiment can be applied only to cases other than a specific combination of an MCS index and the number of allocated PRBs prearranged between the base station and the terminal. For example, if scheduling is determined with MCS index 6 and the number of PRBs is 1, the TBS may be determined as a fixed value of 328 and data may be transmitted, rather than through the above method. Accordingly, the base station and the terminal may predetermine and know TBS values according to a combination of {MCS index or code rate index, number of PRBs}, and the TBS may be determined through the method provided by the embodiment only in cases other than the combination.

The TBS determination method of the embodiment corresponds only to initial transmission, and in retransmission, transmission and reception may be performed on the basis of the assumption of the TBS determined in initial transmission of the corresponding retransmission.

Through the method of the embodiment, the terminal may receive data corresponding to the maximum TBS supported by the terminal, and may be assured of reception of data with a maximum transmission rate.

In step 1-1, step 1-2, and step 1-3 of the embodiment, the method of calculating the TBS is not limited thereto, and another method may be applied.

Embodiment 1-1

[Embodiment 1-1] provides a TBS determination method in consideration of the maximum TBS supported by the terminal.

The terminal receives control information including scheduling information and identifies resource allocation and an MCS value included in the control information. The MCS value may be a modulation order and a code rate. If resource allocation corresponds to allocation of an available maximum frequency band and the MCS value corresponds to the highest modulation order and the highest code rate, the terminal performs data reception or data transmission on the basis of the assumption that the TBS is the maximum TBS supported by the terminal, instead of calculating the TBS.

The base station transmits control information including scheduling information in order to transmit and receive data to and from the terminal. If, through identification of resource allocation and the MCS value included in control information, resource allocation corresponds to allocation of the maximum frequency band that can be allocated to the corresponding terminal and the MCS value corresponds to the highest modulation order and the highest code rate, the base station may perform data transmission and reception on the basis of the assumption that the TBS is the maximum TBS supported by the corresponding terminal instead of calculating the TBS that is the amount of data to be transmitted. The MCS value may be a modulation order and a code rate.

Embodiment 2

[Embodiment 2] provides a method and an apparatus for determining a parameter $N_{IR}$ for determining a buffer for rate matching in downlink data transmission.

$N_{IR}$ may be determined through method 1, method 2, method 3, or method 4 below. In the embodiment, restriction on rate matching may mean that a bit containing the same information is mapped and transmitted twice or more in rate matching. Alternatively, the case in which rate matching is restricted may be limited buffer rate matching (LBRM).

In method 1, $N_{IR}$ may be determined through [Equation 17] below.

$$N_{IR} = N \times N_{bits,init} \quad \text{[Equation 17]}$$

N may be fixed to and determined as 1 or 2, or may be transmitted to the terminal through higher-layer signaling. $N_{bits,init}$ may be a value obtained by multiplying a coded bit or the number of transmitted resources in initial transmission and a modulation order. Method 1 is to prevent rate matching of data from being restricted in initial transmission. N does not need to be an integer.

In method 2, $N_{IR}$ may be determined through [Equation 18].

$$N_{IR} = N \times \text{TBS} \quad \text{[Equation 18]}$$

N may be fixed to and determined as 1 or 2 or may be transmitted to the terminal through higher-layer signaling. Alternatively, N may be a reciprocal number of a code rate of a matrix H to which channel coding is applied. The TBS may be the size of a transmitted data transport block. Method 2 is to prevent rate matching of data from being restricted in initial transmission. N does not need to be an integer.

In method 3, $N_{IR}$ may be determined through [Equation 19] below.

$$N_{IR} = TBS_{ref} \times \frac{1}{CR_{ref}} \qquad \text{[Equation 19]}$$

$TBS_{ref}$ may be a reference TBS for calculating $N_{IR}$. $TBS_{ref}$ may be a value predetermined as the maximum TBS supported by the corresponding terminal, or may be transmitted from a higher layer. $CR_{ref}$ may be a reference code rate for calculating $N_{IR}$. $CR_{ref}$ may be determined as one of code rates supported by the corresponding terminal. Alternatively, $CR^{ref}$ may be determined according to the BG used when the TBS is channel-coded. For example, $CR_{ref}$ may be determined as 2/3 in the case of transmission corresponding to the LDPC code of BG #1, and may be determined as 2/5 in the case of transmission corresponding to the LDPC code of BG #2. Method 3 is to prevent rate matching of data from being restructured in initial transmission or first retransmission for a TBS equal to or smaller than a specific TBS.

Method 4 is a combination of method 1, method 2, or method 3 in which a minimum value of the values determined in the methods may be provided, and N may be determined using [Equation 20] below.

$$N_{IR} = \min\left(N \times N_{bits,init}, TBS_{ref} \times \frac{1}{CR_{ref}}\right) \qquad \text{[Equation 20]}$$

min(a, b) is the smaller of the values a and b. N may be fixed to and determined as 1 or 2, or may be transmitted to the terminal through higher-layer signaling. $N_{bits,init}$ may be a value obtained by multiplying a coded bit or the number of transmitted resources in initial transmission and a modulation order. $TBS_{ref}$ may be a reference TBS for calculating A. $TBS_{ref}$ may be a value predetermined as the maximum TBS supported by the corresponding terminal, or may be transmitted from a higher layer. $CR_{ref}$ may be a reference code rate for calculating $N_{IR}$. $CR_{ref}$ may be determined as one of code rates supported by the corresponding terminal. Alternatively, $CR_{ref}$ may be determined according to the BS that is used when the TBS is channel-coded. For example, $CR_{ref}$ may be determined as 2/3 in the case of transmission corresponding to the LDPC code of BG #1, and determined as 2/5 in the case of transmission corresponding to the LDPC code of BG #2. Method 4 is to allow the terminal to configure as small a soft buffer as possible and to prevent rate matching from being restricted as much as possible in initial transmission.

Through calculation of $N_{IR}$ provided by the embodiment, the terminal can occupy a soft buffer memory corresponding to $N_{IR}$ bits for one transport block, and can increase transmission and reception performance.

$N_{cb}$ may be calculated through [Equation 21] below using the provided $N_{IR}$.

$$N_{cb} = \min\left(\left\lfloor \frac{N_{IR}}{C} \right\rfloor, K_w\right) \qquad \text{[Equation 21]}$$

$K_W$ denotes the number of bits to which all parities generated by encoding information bits through channel-coding are added, and may be about triple the information bits on the basis of the assumption of LTE. C denotes the number of code blocks required for transmitting and receiving a transport block to be transmitted. Thereafter, rate matching may be performed as shown in [pseudo-code 7] below.

[pseudo-code 7]
[Start]
Denoting by E the rate-matching output sequence length for the r-th coded block, and rvidx the redundancy version number for this transmission (rvidx=0, 1, 2 or 3), the rate-matching output bit sequence is ek, k=0, 1, ..., E−1.

Define by G the total number of bits available for the transmission of one transport block. G may be the number of resources to which data is applied.

Set $G'=G/(N_L \cdot Q_m)$ where Qm is equal to 2 for QPSK, 4 for 16 QAM, 6 for 64 QAM and 8 for 256 QAM, and where For transmit diversity:
  NL is equal to 2,
Otherwise:
  NL is equal to the number of layers a transport block is mapped onto Set γ=G' mod C, where C is the number of code blocks required for transmitting corresponding data.

```
if r≤C-γ-1
    set E = N_L ·Q_m ·⌊G' / C⌋
else
    set E = N_L ·Q_m ·⌈G' / C⌉
end if
``` k0 may be a start point of rate matching determined by RV, and may be prearranged and thus known by the base station and the terminal.

```
Set k = 0 and j = 0
while { k < E }
    if w_(k0+j)mod N_cb ≠< NULL >
        e_k = w_(k0+j)mod N_cb
        k = k+1
    end if
    j = j + 1
end while
[End]
```

In [pseudo-code 7] above, wj denotes a jth bit in a value to which all parity bits are added after an rth code block is encoded, and ek denotes a rate-matched kth bit after an rth code block is encoded. Rate matching is restricted by $N_{cb}$ due to $e_k = w(k_0+j) \bmod N_{cb}$, and $N_{cb}$ is influenced by $N_{IR}$ as shown in [Equation 21], which may mean that rate matching is restricted by $N_{IR}$.

[pseudo-code 7] above is an example of a rate matching process after No is obtained, and the disclosure does not need to be limited to [pseudo-code 7].

The embodiment has been described on the basis of downlink data transmission, but may be applied to uplink data transmission.

Embodiment 3

[Embodiment 3] provides a method and an apparatus for determining a parameter $N_{IR}$ for determining a buffer for rate matching when a terminal configured to perform scheduling with a short TTI or the length of a TTI of a slot or a subslot in the LTE system is scheduled with the short TTI or the subslot.

The conventional LTE system performs transmission and reception on the basis of a subframe of 1 ms in a frequency-division duplexing (FDD) system. However, a method by which the terminal monitors a control channel in units of 2 symbols, 3 symbols, or 7 symbols, transmits scheduling information, and transmits and receives data may be used.

Figure 8:
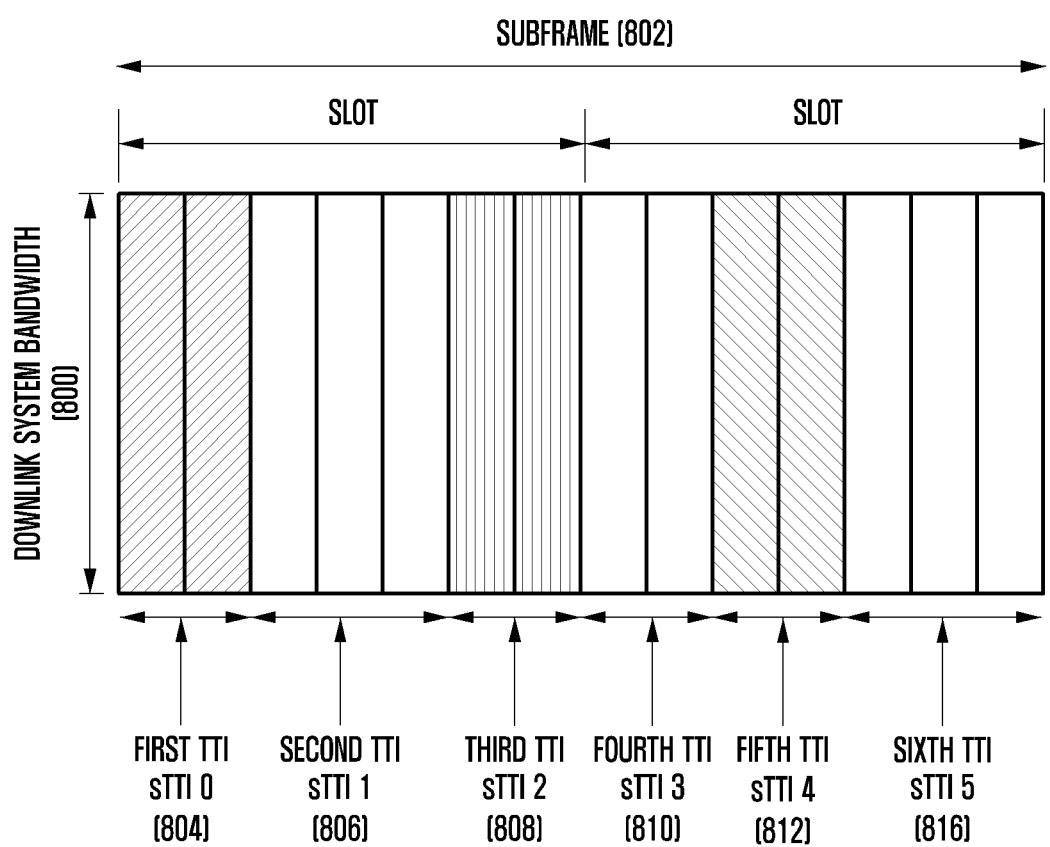
FIG. 8 illustrates a structure of a short TTI in a downlink subframe using a short transmission time interval (TTI) of 2 symbols or 3 symbols in the LTE system.
Figure 9:
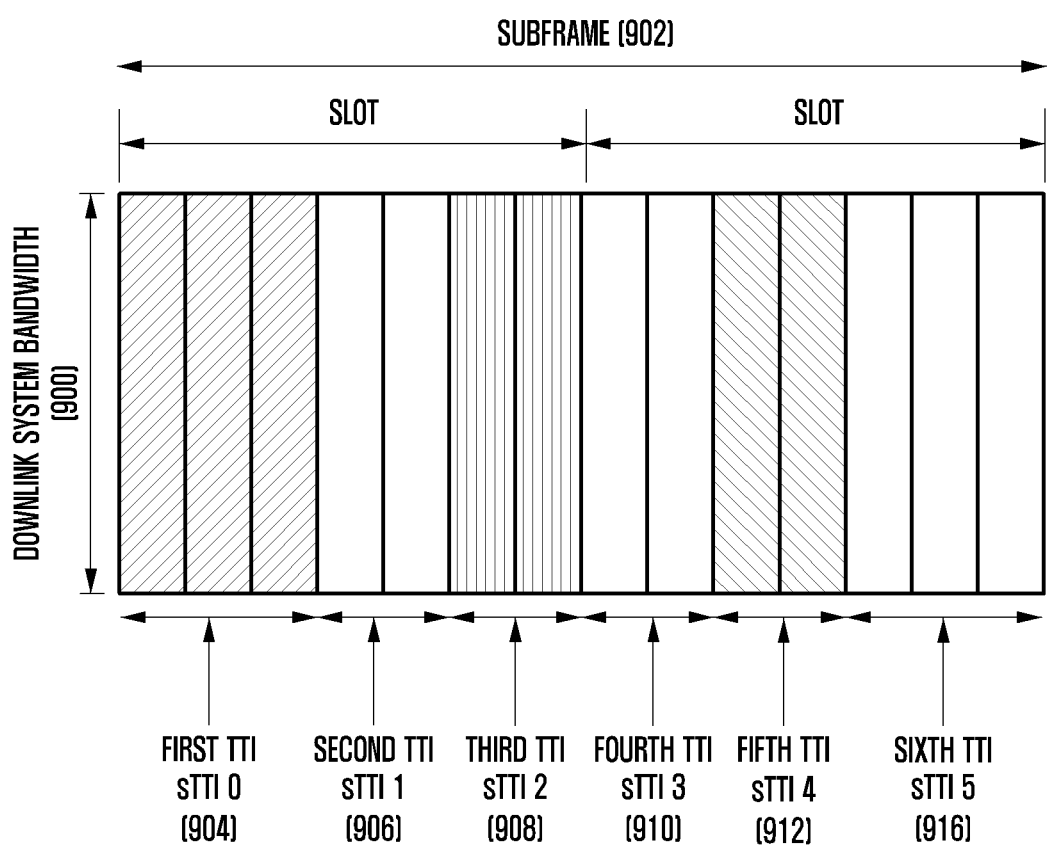
FIG. 9 illustrates another structure of the short TTI in the downlink subframe using the short transmission time interval (TTI) of 2 symbols or 3 symbols in the LTE system.

FIGS. 8 and 9 illustrate examples of the structure of an sTTI having a length of 2 symbols or 3 symbols in the downlink. In FIG. 8, 14 symbols within one subframe 802 are divided into 2, 3, 2, 2, 2, and 3 symbols, and sTTI #0 804, sTTI #1 806, sTTI #2 808, sTTI #3 810, sTTI #4 812, and sTTI #5 816 are mapped thereto, respectively. The sTTI pattern in FIG. 8 is applied when a PDCCH of conventional LTE is mapped to 2 OFDM symbols. In FIG. 9, 14 symbols within one subframe 902 are divided into 3, 2, 2, 2, 2, and 3 symbols, and sTTI #0 904, sTTI #1 906, sTTI #2 908, sTTI #3 910, sTTI #4 912, and sTTI #5 916 are mapped thereto, respectively. The sTTI pattern in FIG. 9 is applied when a PDCCH of conventional LTE is mapped to 1 or 3 OFDM symbols.

Figure 10:
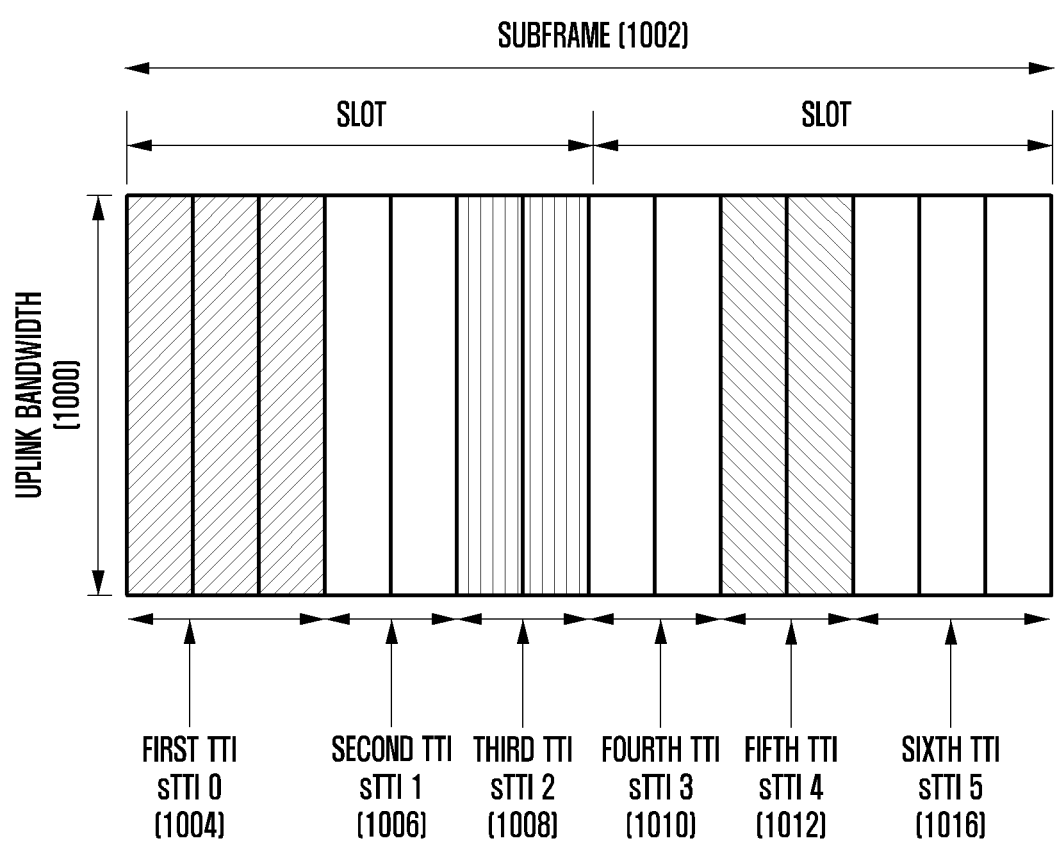
FIG. 10 illustrates a structure of a short TTI in an uplink subframe using a short transmission time interval (TTI) of 2 symbols or 3 symbols in the LTE system.

FIG. 10 illustrates an example of the structure of an sTTI having a length of 2 symbols or 3 symbols in the uplink. 14 symbols within one subframe 1002 are divided into 3, 2, 2, 2, 2, and 3 symbols, and sTTI #1004, sTTI #1 1006, sTTI #2 1008, sTTI #3 1010, sTTI #4 1012, and sTTI #5 1016 are mapped thereto, respectively.

Figure 11:
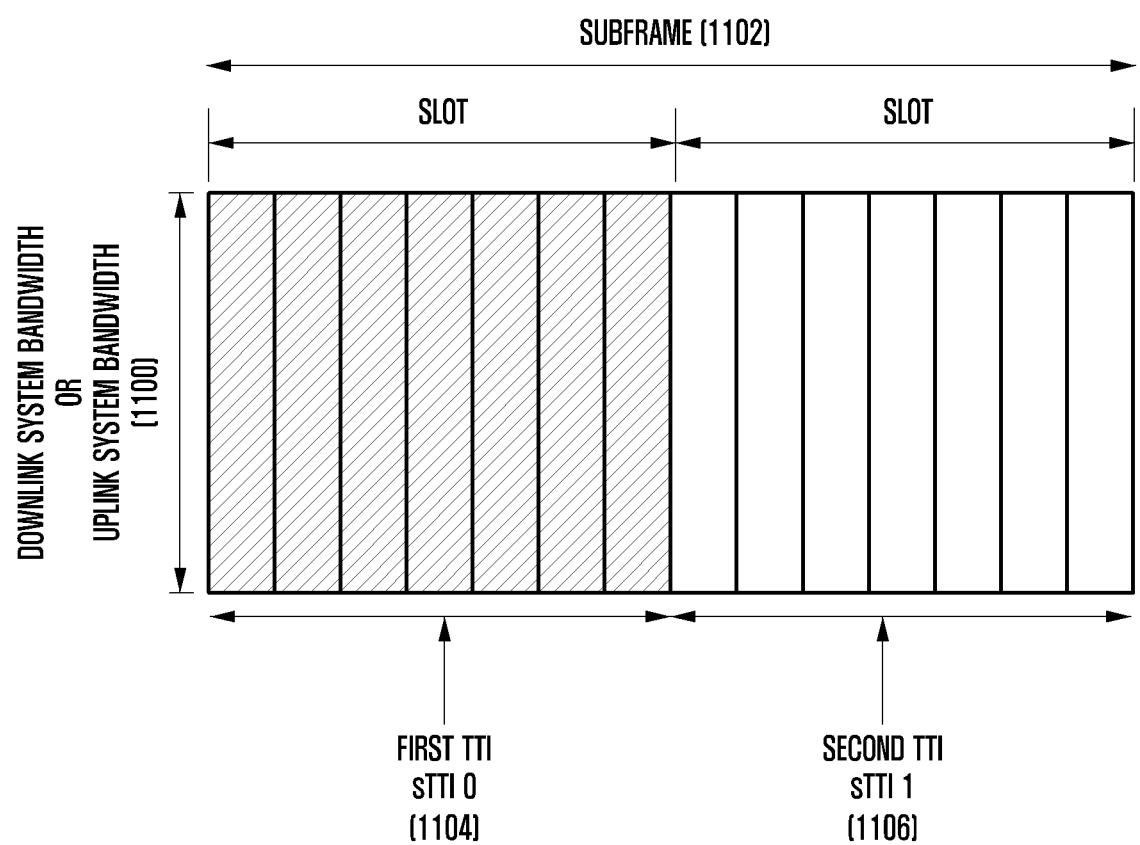
FIG. 11 illustrates a structure of the short TTI in the downlink or uplink subframe using the short TTI of 7 symbols in the LTE system.

FIG. 11 illustrates an example of the structure of an sTTI having the length of 7 symbols in the downlink and the uplink. sTTI #1104 and sTTI #1 1106 are mapped to 7 symbols and 7 symbols of 14 symbols within one subframe 1102.

Shortened-TTI transmission described below may be referred to as first-type transmission, and normal-TTI transmission may be referred to as second-type transmission. The first-type transmission is a scheme for transmitting a control signal, a data signal, or both control and data signals during an interval shorter than 1 ms, and the second-type transmission is a scheme for transmitting a control signal, a data signal, or both control and data signals in an interval of 1 ms. Meanwhile, hereinafter, the term "shortened-TTI transmission" is interchangeably used with "first-type transmission", and "normal-TTI transmission" is interchangeably used with "second-type transmission". The first-type terminal may support both the first-type transmission and the second-type transmission or only the first-type transmission. The second-type terminal may support only the second-type transmission, and may be incapable of supporting the first-type transmission. In the disclosure, for convention, the first-type transmission may be understood as a terminal for the first-type transmission. If there are a normal-TTI and a longer-TTI instead of a shortened-TTI and a normal-TTI, normal-TTI transmission may be referred to as first-type transmission and longer-TTI transmission may be referred to as second-type transmission. In the disclosure, "first-type reception" and "second-type reception" may refer to processes for receiving signals transmitted through the first-type transmission and the second-type transmission.

Hereinafter, unless specially mentioned otherwise, the terminal that configures the shortened-TTI transmission may be referred to as a first-type terminal, and a normal-TTI terminal that does not configure the shortened-TTI transmission may be referred to as a second-type terminal. The first-type terminal may include a terminal capable of transmitting control information, data, or control information and data during a transmission time interval of 1 ms or shorter, and the second-type terminal may include a terminal capable of transmitting control information, data, or control information and data during a transmission time interval of 1 ms. Meanwhile, hereinafter, "shortened-TTI terminal" is interchangeably used with "first-type terminal", and "normal-TTI terminal" is interchangeably used with "second-type terminal". Further, in the disclosure, shortened-TTI, shorter-TTI, shortened TTI, shorter TTI, short TTI, and s TTI may be interchangeably used with the same meaning. In the disclosure, normal-TTI, normal TTI, subframe TTI, and legacy TTI may be interchangeably used with the same meaning.

In the disclosure, a downlink transmission time interval is a unit for transmission of a control signal and a data signal or a unit for transmission of a data signal. For example, in the conventional LTE system, a downlink transmission time interval is a subframe, which is a time unit of 1 ms. Meanwhile, in the disclosure, an uplink transmission time interval is a unit for transmission of a control signal or a data signal or a unit for transmission of a data signal. In the conventional LTE system, an uplink transmission time interval is a subframe, which is a time unit of 1 ms, which is the same as the downlink.

In the disclosure, a shortened-TTI mode is a mode in which the terminal or the base station transmits and receives a control signal or a data signal in units of shortened TTIs, and a normal-TTI mode is a mode in which the terminal or the base station transmits and receives a control signal or a data signal in units of subframes.

In the disclosure, shortened-TTI data is data transmitted in a PDSCH or a PUSCH that is transmitted and received in units of shortened TTIs, and normal-TTI data is data transmitted in a PDSCH or a PUSCH that is transmitted and received in units of subframes. In the disclosure, a downlink control channel for shortened-TTI is a physical channel for transmitting a control signal for operation in the shortened-TTI mode, which is referred to as an sPDCCH, and a control signal for normal TTI is a control signal for operation in the normal-TTI mode. For example, the downlink control channel for normal-TTI may be a PCFICH, a PHICH, a PDCCH, or an EPDCCH in the conventional LTE system. Similarly, in the disclosure, an uplink control channel for shortened-TTI may be referred to as an sPUCCH, and may include one or more pieces of HARQ-ACK/NACK information, channel state information, and scheduling requirements of data transmitted in the downlink.

In the disclosure, the term "physical channel" and the term "signal" of the conventional LTE or LTE-A system may be interchangeably used with "data" or "control signal". For example, a PDSCH is a physical channel for transmitting normal-TTI data, but a PDSCH in the disclosure may refer to normal-TTI data. Further, an sPDSCH is a physical channel for transmitting shortened-TTI data, but an sPDSCH in the disclosure may refer to shortened-TTI data. Similarly, in the disclosure, shortened-TTI data transmitted in the downlink and the uplink is referred to as an sPDSCH and an sPUSCH.

As described above, the disclosure proposes a detailed method of defining the transmission and reception operations of the shortened-TTI terminal and the base station and operating the conventional terminal and the shortened-TTI terminal together in the same system. In the disclosure, a normal-TTI terminal indicates a terminal that transmits and receives control information and data information in a unit of 1 ms or 1 subframe. Control information for the normal-TTI terminal may be carried on and transmitted by a PDCCH mapped to a maximum of 3 OFDM symbols in one subframe, or may be carried on and transmitted by an EPDCCH mapped to a specific resource block in one entire subframe. A shortened-TTI terminal may transmit and receive data in units of subframes, like a normal-TTI terminal, or may transmit and receive data in units smaller than a subframe. Alternatively, the shortened-TTI terminal may be a terminal supporting only transmission and reception in units smaller than a subframe.

In the conventional LTE system using subframes of 1 ms as a TTI, $N_{IR}$ is determined as shown in [Equation 22] below. $M_{limit}$ is fixed to 8.

$$N_{IR} = \left\lfloor \frac{N_{soft}}{K_C \cdot K_{MIMO} \cdot \min(M_{DL\_HARQ}, M_{limit})} \right\rfloor \quad \text{[Equation 22]}$$

If a terminal in which a short TTI is configured receives scheduling with the short TTI, $N_{IR}$ may be replaced with $N_{IR,sTTI}$, calculated as shown in [Equation 23] below.

$$N_{IR,sTTI} = \left\lfloor \frac{N_{soft}}{K_C \cdot K_{MIMO} \cdot \min(M_{DL\_HARQ}, M_{limit,sTTI})} \right\rfloor \quad \text{[Equation 23]}$$

$M_{limit,sTTI}$ may be predetermined as 16. The value of 16 is only an example, and the embodiment is not limited thereto. $M_{limit,sTTI}$ may be value configured in the terminal through higher-layer signaling.

Figure 12:
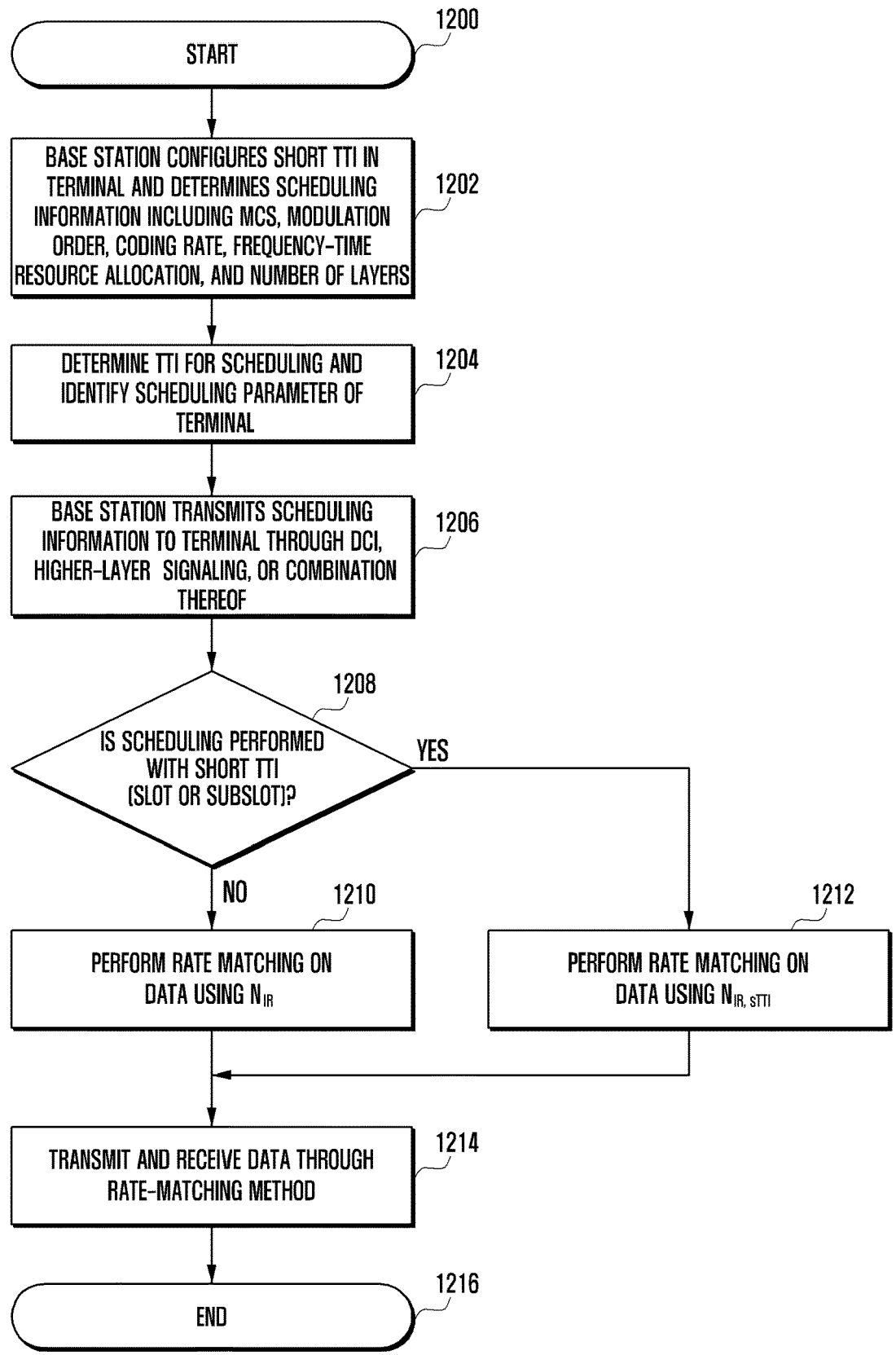
FIG. 12 is a flowchart illustrating the operation of the base station and the terminal according to a third embodiment of the disclosure.
Figure 13:
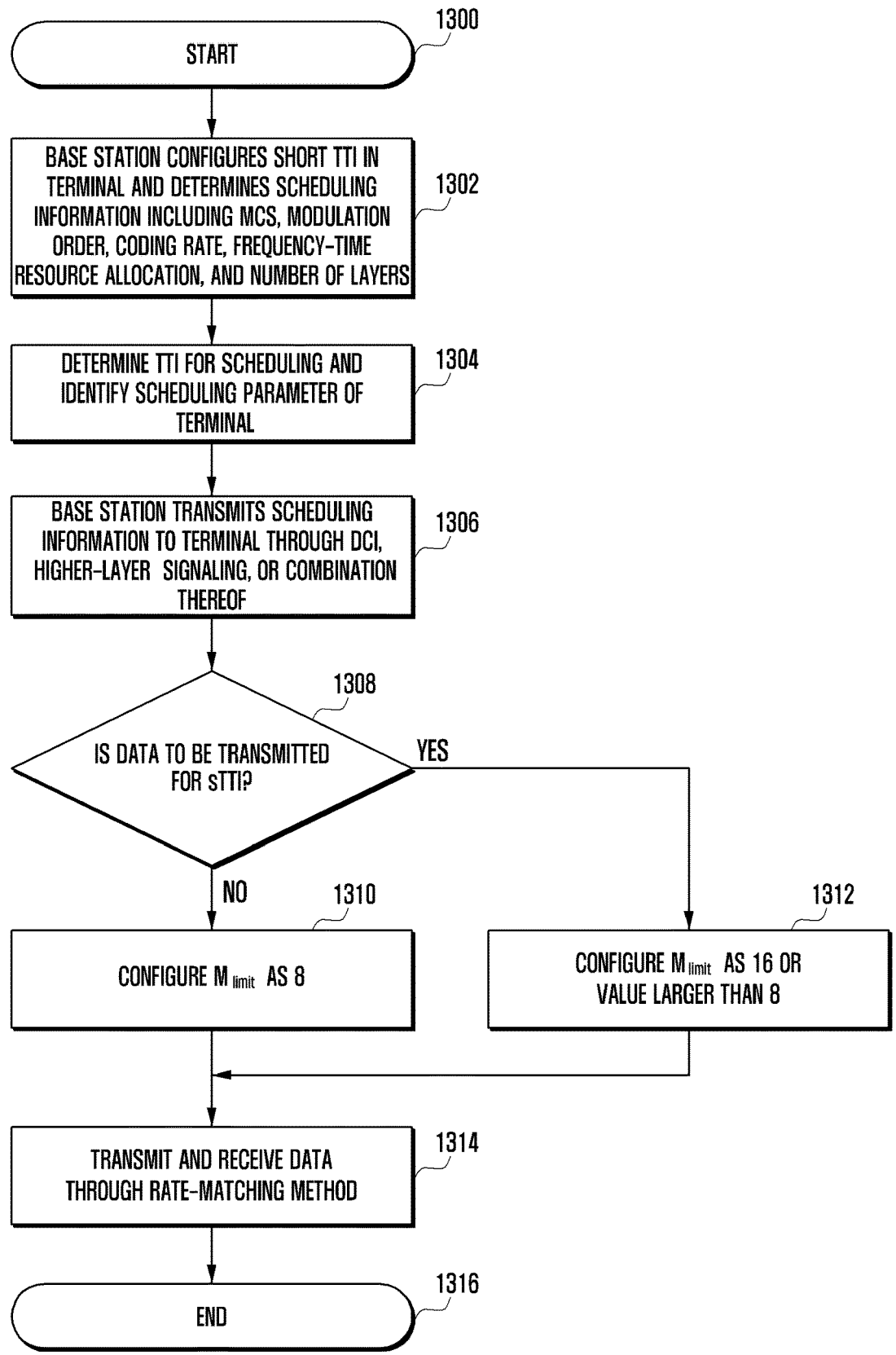
FIG. 13 is a flowchart illustrating another operation of the base station and the terminal according to the third embodiment of the disclosure.

FIG. 12 is a flowchart illustrating a method by which a terminal in which a short TTI is configured performs rate matching during a data transmission/reception process. In step 1200, a data scheduling and transmission/reception step starts. The base station configures the terminal to perform short TTI transmission and determines scheduling information, and the terminal identifies scheduling information transmitted from the base station in steps 1202, 1204, and 1206. The scheduling information may include an MCS, a modulation order, a coding rate, a code rate, resource allocation information, and the number of layers, and may be transmitted through a physical control channel and higher-layer signaling. The base station and the terminal identify whether the scheduling is performed with a short TTI such as a slot or a subslot in step 1208. If the scheduling is performed in subframes having a unit size of 1 ms, rate matching is performed using $N_{IR}$ determined through the method provided by [Equation 22] above in step 1210. If the scheduling is performed with a short TTI such as a slot or a subslot, rate matching is performed using $N_{IR,sTTI}$ determined through the method provided by [Equation 23] above in step 1212. Alternatively, if $M_{limit,sTTI}$ is used instead of $M_{limit}$ in [Equation 22] or $M_{limit}$ is scheduled with a short TTI such as a slot or a subslot, or in the case of an sPDSCH (a data channel transmitted with a short TTI), $M_{limit}$ may be defined as 16. Alternatively, for a downlink shared channel (DL-SCH) related to the sPDSCH, the terminal in which transmission of the sTTI of 2 symbols or 3 symbols or the subslot is configured may define $M_{limit}$=16 and use the same for calculating $N_{IR}$, and may define $M_{limit}$=8 and use the same for calculating $N_{IR}$ in other cases. This is to allow the terminal, in which transmission of the sTTI of 2 symbols or 3 symbols or the subslot is configured, to operate without an excessively large soft buffer. In the above description, $M_{limit}$ for the sTTI has been indicated as 16, but is not limited thereto, and any value larger than 8 can be used. The operation of the base station and the terminal according thereto is illustrated in FIG. 13.

Embodiment 4

[Embodiment 4] provides a method and an apparatus for selecting a base-graph of the LDPC code in downlink data transmission and reception.

As described above, the base station and the terminal should determine whether to perform channel coding and decoding by selecting a base-graph between two base-graphs, that is, BG #1 and BG #2, in the LDPC code.

The base station transmits control information containing base-graph information of 1 bit to the terminal in downlink scheduling, and the terminal decodes the corresponding control information on the basis of the assumption of a DCI format including base-graph information of 1 bit, becomes aware of the type of the base-graph in the control information, and performs decoding using the base-graph indicated by the control information.

The above method is to ensure base-graph information in retransmission by transmitting the base-graph information in control information (DCI), in comparison with the case in which the base-graph is determined only by a code rate and a TBS. However, since data including system information is never retransmitted, it is not necessary to insert base-graph information into control information when transmitting the control information. Accordingly, whether to insert base-graph information into control information for scheduling corresponding data may be determined according to the type of transmitted downlink data.

For example, while DCI for scheduling data transmitted only to a specific terminal includes base-graph information, DCI for scheduling data transmitted to a plurality of terminals may not include base-graph information. Data transmitted to a plurality of terminals may include system information.

Figure 16:
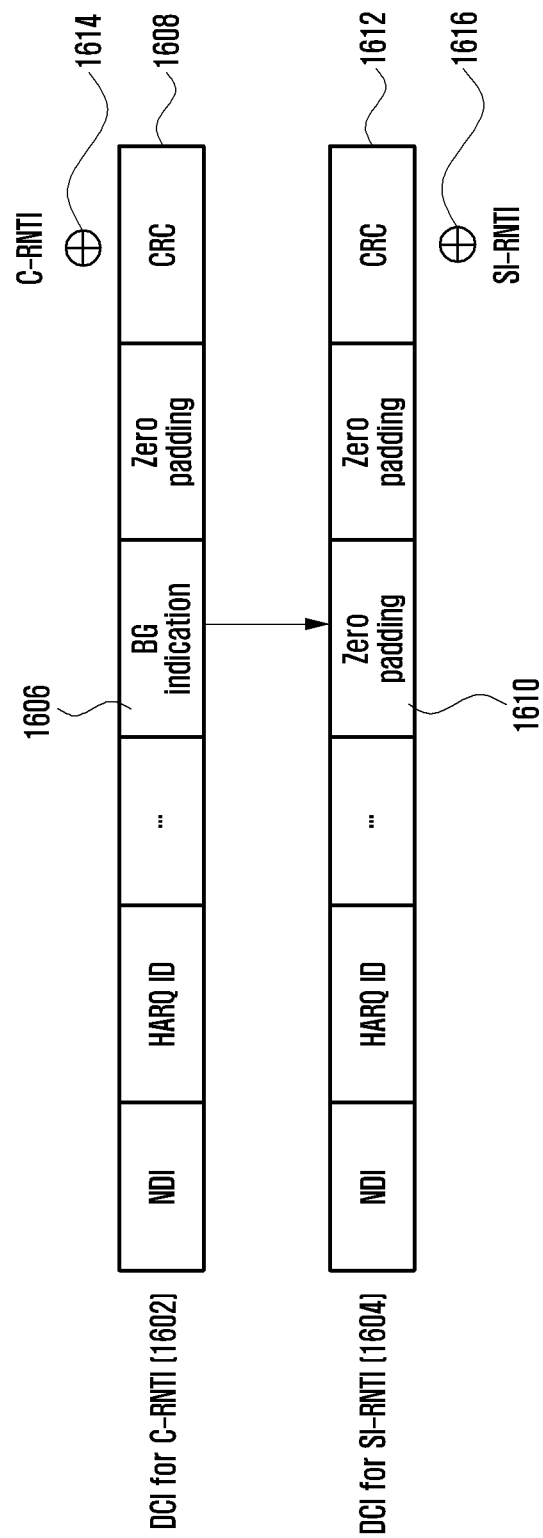
FIG. 16 is a block diagram illustrating downlink control information (DCI) according to a fourth embodiment of the disclosure.

FIG. 16 illustrates whether or not a BG indication is included depending on the type of an RNTI masked on the CRC. DCI 1602 masked by a C-RNTI includes a BG indication 1606, but DCI 1604 masked by an SI-RNTI does not include a BG indication, but instead includes zero padding 1610 as necessary. Masking an RNTI on the CRC in the disclosure may mean a process of adding some or all bits of the RNTI and the CRC 1608 or 1612 in units of bits through the XOR operation, modula 2 addition, or the operation 1614 or 1616 of calculating the remainder obtained by dividing the sum by 2. This can be described below using a condition in a process of describing DCI. In the disclosure, base-graph information may be transmitted through a base-graph indication.

[Start of description of DCI format]
[DCI format x]
...

BG indication –0 or 1 bit. This bit field has 1 bit only when DCI is masked by a C-RNTI and is then transmitted.

[End of description of DCI format]

In the disclosure, it has been described that methods of performing transmission to a specific terminal are separated by the C-RNTI, but the separation may be performed according to the type of a search space or the type of a CORESET (control resource set). For example, DCI mapped to a common search space may not include base-graph information, and DCI mapped to a UE-specific search space may include base-graph information. DCI mapped to a CORESET configured in common in a plurality of terminals may not include base-graph information, and DCI mapped to a CORESET configured in a specific terminal may include base-graph information.

Figure 17:
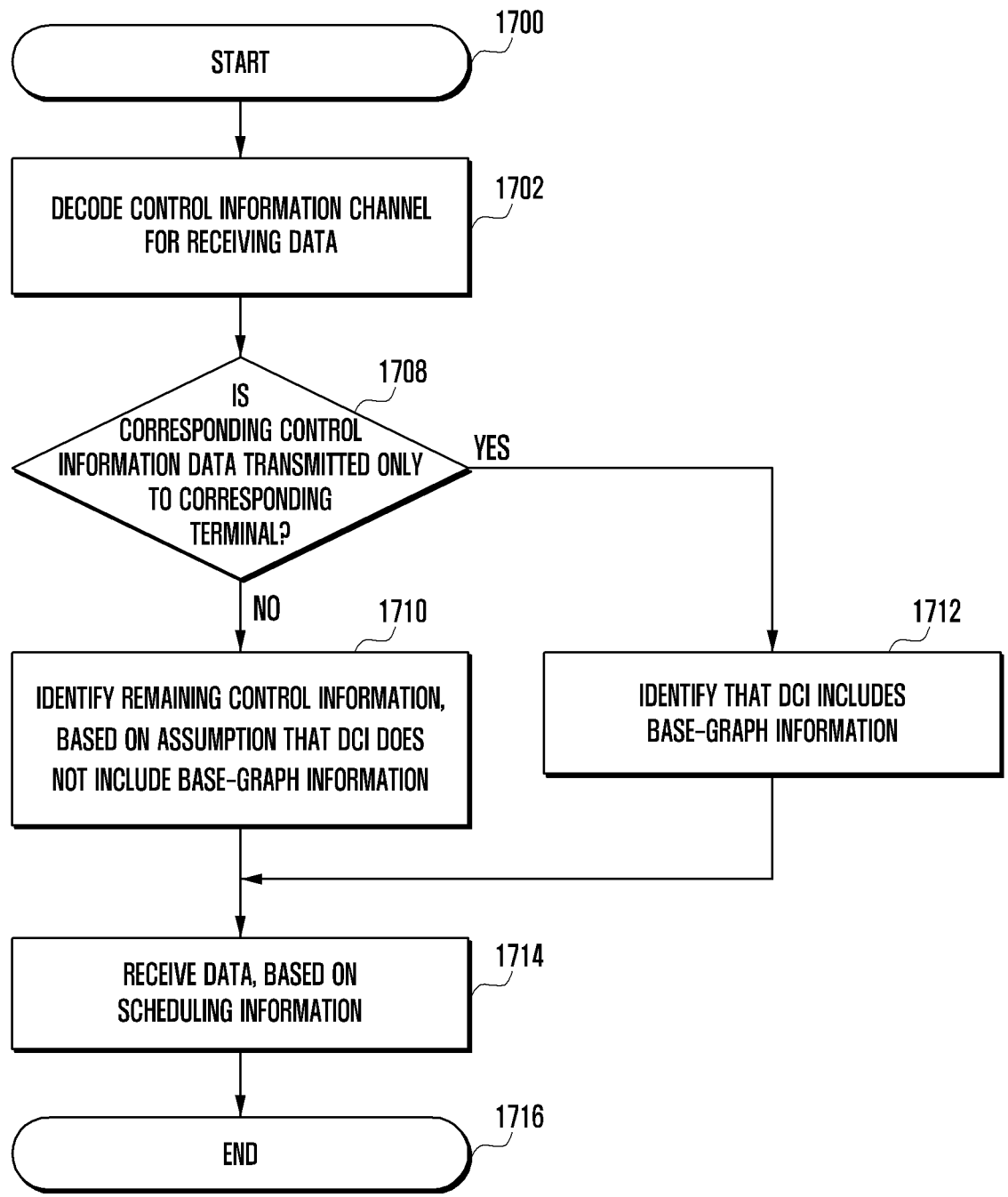
FIG. 17 is a block diagram illustrating the operation of the terminal according to the fourth embodiment of the disclosure.
Figure 18:
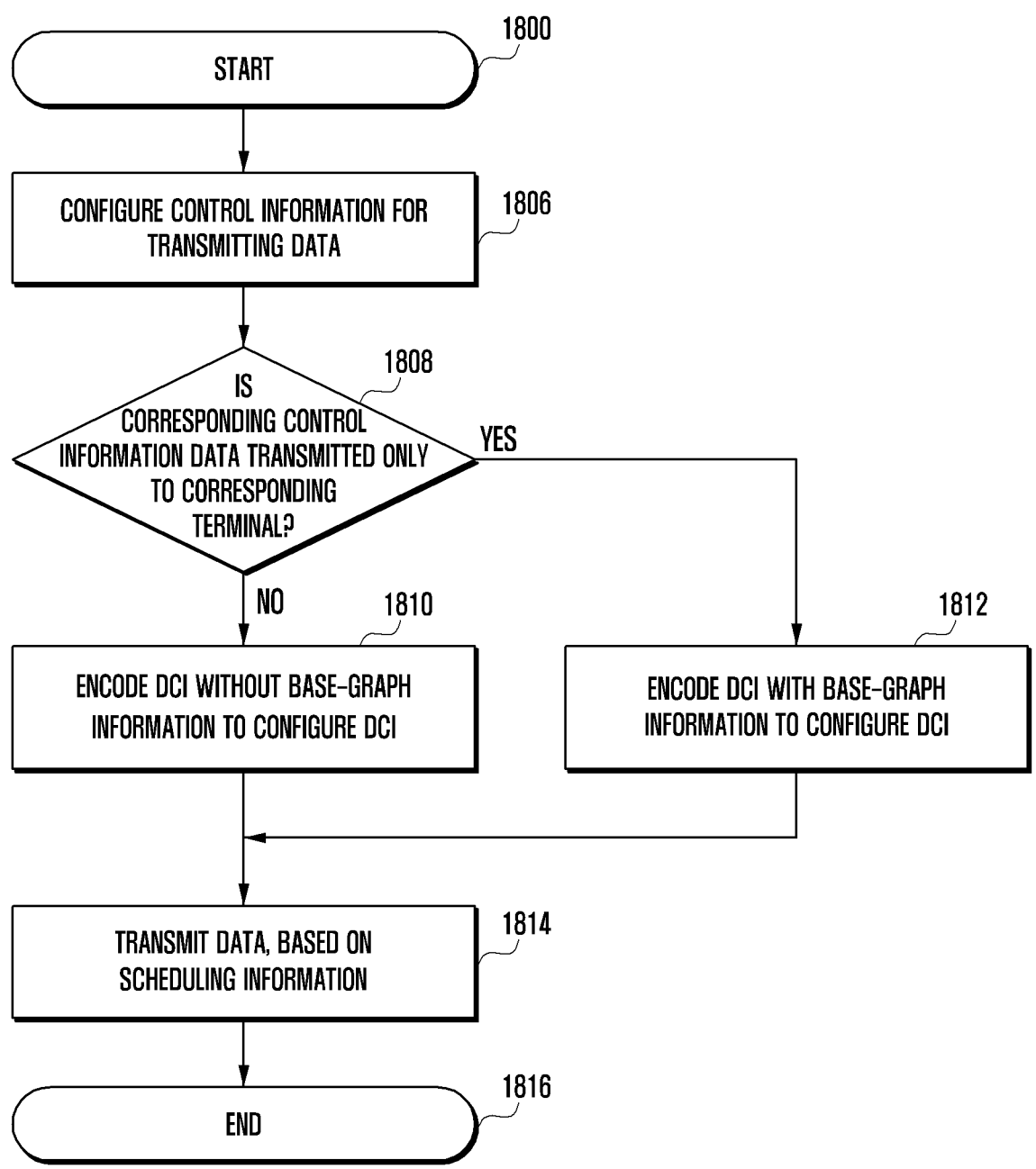
FIG. 18 is a block diagram illustrating the operation of the base station according to the fourth embodiment of the disclosure.

FIGS. 17 and 18 illustrate the operation of the terminal and the base station. In a more detailed example, when performing control information decoding and CRC check in step 1702, the terminal may decode the control information by determining whether the control information includes base-graph information according to the type of the RNTI masked on the CRC in step 1708 and proceeds to step 1710 or 1712. For example, when the terminal decodes the control information in step 1702 and checks the CRC, if the CRC check is passed through masking of the C-RNTI, the terminal is aware that the corresponding DCI includes base-graph information and identifies the corresponding base-graph information in step 1712, and, if the CRC check is passed through masking of the SI-RNTI, identifies the remaining DCI information on the basis of the assumption that the corresponding DCI includes no base-graph information in step 1710. When configuring control information in step 1802, the base station determines whether the control information is transmitted only to the corresponding terminal in step 1808. If the control information is transmitted only to a specific terminal, the base station configures control information including a base-graph indication in step 1812. If the control information is transmitted to a plurality of terminals, the base station configures DCI without a base-graph indication in step 1810. The base station transmits data according to the determined control information in step 1814.

Embodiment 5

[Embodiment 5] provides a method and an apparatus for operating the base station and the terminal when a base-graph indication of the LDPC code is included in control information in downlink and uplink data transmission and reception and corresponding data scheduling.

Figure 19:
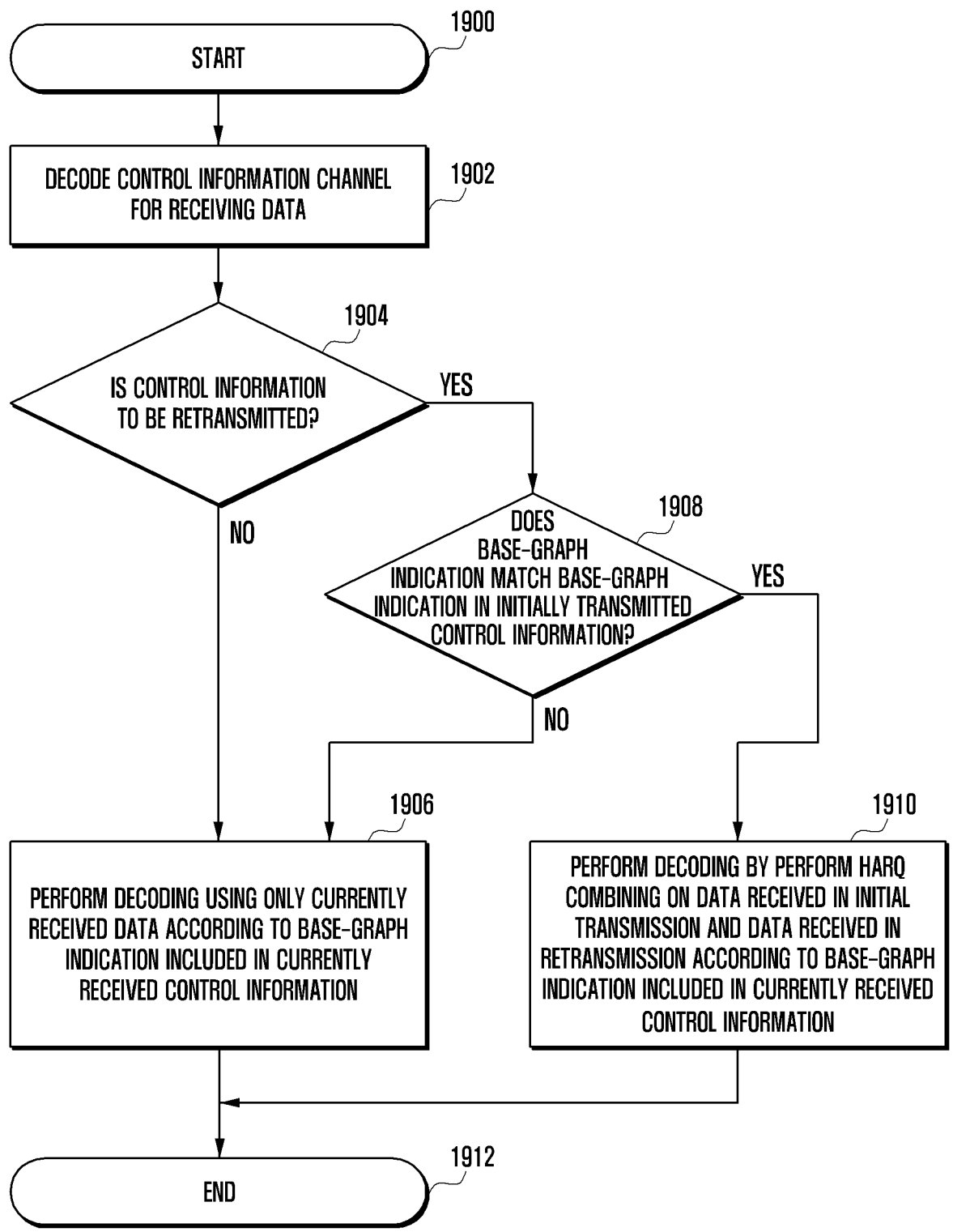
FIG. 19 is a block diagram illustrating an operation in which the terminal receives downlink data according to a fifth embodiment of the disclosure.
Figure 20:
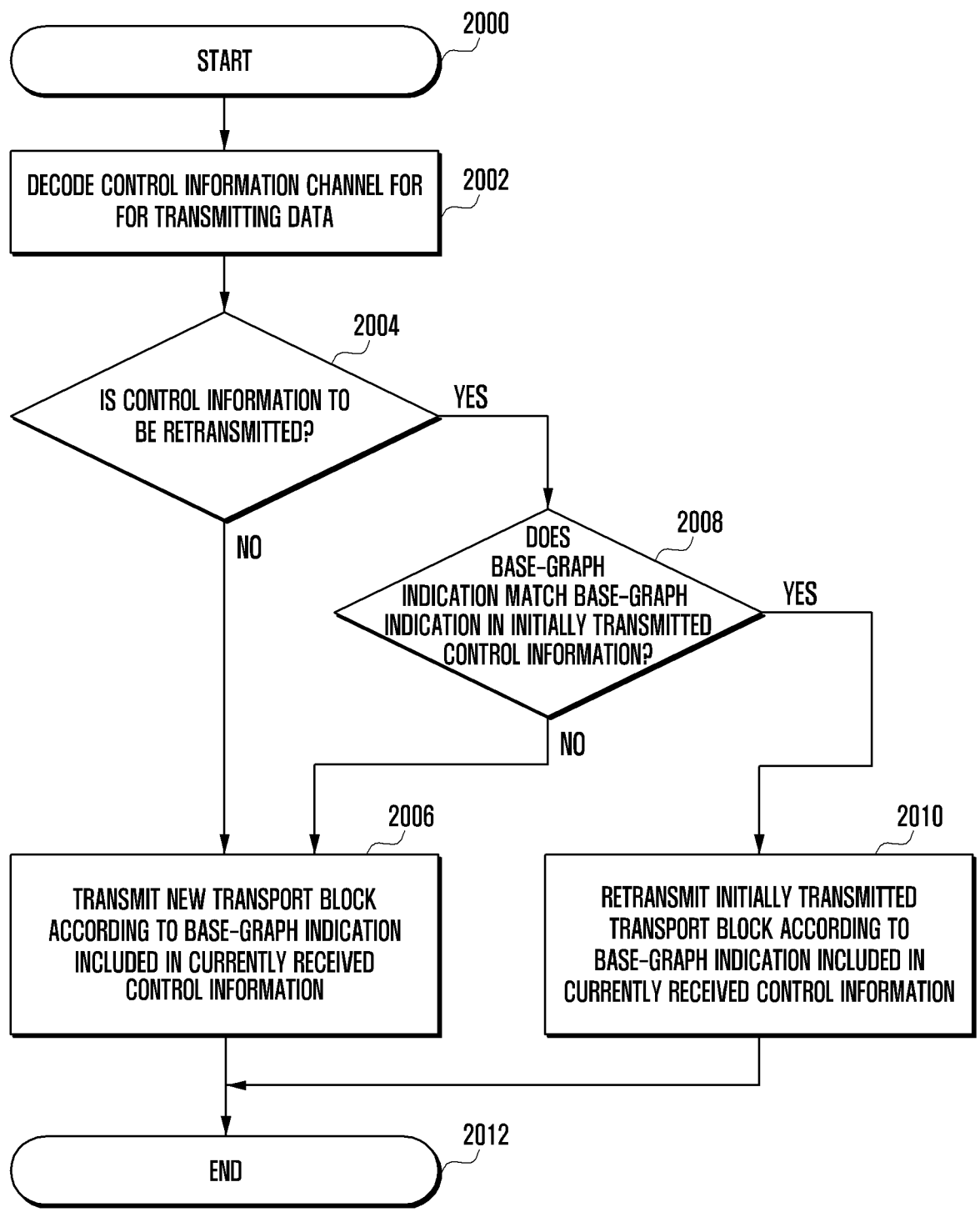
FIG. 20 is a block diagram illustrating an operation in which the terminal transmits uplink data according to the fifth embodiment of the disclosure.

When the terminal decodes downlink control information, if the corresponding control information is for retransmission and a base-graph indication included in the control information is different from a base-graph indication included in control information for initial transmission, the terminal decodes the corresponding transport block using only data received in retransmission without performing HARQ combining on data received in initial transmission and data received in retransmission. For example, if the base-graph indication indicates BG #1 in control information of initial transmission of a specific transport block but a base-graph indication also indicates BG #1 in control information of retransmission of the transport block, the terminal attempts decoding by performing HARQ combining. On the other hand, if the base-graph indication indicates BG #1 in control information of initial transmission of a specific transport block but a base-graph indication also indicates BG #2 in control information of retransmission of the transport block, the terminal attempts decoding using only data received in retransmission without performing HARQ combining. As a detailed example thereof, the operation of the terminal for transmitting and receiving downlink and uplink data is illustrated in FIGS. 19 and 20.

Embodiment 6

[Embodiment 6] provides a TBS determination method according to selection of a BG and CB-CRC. The embodiment may be applied to the specific case in which a TBS is segmented into two or more code blocks when the TBS is large and each code block is channel-coded to an LDPC code using BG #2. That is, the embodiment may be applied to the case in which transmission can be performed using BG #2 even when the TBS is large. In the embodiment, R_1 and R_2 may indicate code rates which are references for selecting BG #1 or BG #2 of the LDPC, and may be interchangeably used with R1 and R2. For example, R1=1/4 and R2=2/3, but the method provided by the disclosure is not limited thereto. Further, in the disclosure, R, referring to the code rate, R1, and R2 may be expressed and determined in various methods, such as a fraction and a decimal. When a BG is selected between BG #1 and BG #2 in data transmission, a code rate and a soft buffer of the terminal may be considered. In the embodiment, a process for making the TBS a multiple of 8, a multiple of the number of CBs, or a common multiple or the lowest common multiple of 8 and the number of CBs may be performed at the end of TBS calculation.

The base station may transmit data by allocating frequency resources of a predetermined number of PRBs and time resources of a predetermined number of slots or symbols to the terminal, and scheduling information related thereto may be transmitted to the terminal through downlink control information (DCI), configuration transmitted through higher-layer signaling, or a combination thereof. When scheduling information of the base station and the terminal is given, the TBS may be determined in the following order.

Step 1: determine the number of temporary information bits (A)

Step 2: determine the number (C) of temporary CBs using determined A, perform byte alignment on a value obtained by adding the TB-CRC length to the TBS (making A a multiple of 8), and determine the TBS by controlling A to be a multiple of the number of temporary CBs In step 1, the temporary TBS is determined in consideration of the number of resource areas to which data to be transmitted can be mapped. The number of temporary information bits may be determined by a combination of one or more of a code rate (R), a modulation order (Qm), the number ($N_{RE}$) of REs to which rate-matching data is mapped, the number of allocated PRBs or RBs (#PRB), the number of allocated OFDM symbols, the number of allocated slots, and a reference value of the number of mapped REs within one PRB. For example, A may be determined by $A=N_{RE}$ S Qm S R S v, corresponding to [Equation 10]. Qm, which is the modulation order, and R which is the code rate, may be transferred to the terminal while being included in DCI. The number v of layers used for transmission may be transmitted to the terminal through DCI, higher-layer signaling, or a combination thereof. $N_{RE}$ may be determined by the base station using the number of REs to which data is mapped through rate matching when data is transmitted, and may be equally understood by the base station and the terminal if both the base station and the terminal are aware of resource allocation information. When $N_{RE}$ is calculated, data is mapped in a rate-matching manner, but data is punctured due to a specific reason such as CSI-RS, URLLC, or UCI transmission, and thus an RE that is not actually mapped is included in $N_{RE}$. This is to make both the base station and the terminal equally understand the TBS even when the base station does not transmit some data scheduled to be mapped in a puncturing scheme without informing the terminal thereof. Alternatively, $N_{RE}$ may be a value calculated using the number of actually available REs. The calculation may include quantization. For example, through transmission of an MCS index to the terminal, information on Qm and R may be transmitted. The modulation order indicates information such as QPSK, 16 QAM, 64 QAM, 256 QAM, and 1024 QAM. Qm=2 in the case of QPSK, Qm=4 in the case of 16 QAM, Qm=6 in the case of 64 QAM, Qm=8 in the case of 256 QAM, and Qm=10 in the case of 1024 QAM. That is, Qm may be the number of bits that can be transmitted in a modulated symbol. For example, Qm and R are transmitted together by an MCS index of 5 bits, but may be transmitted to the terminal in various methods such that Qm and R are transmitted by an MCS index of 6 bits through DCI or such that each of Qm of 3 bits and R of 3 bits uses a bit field. Alternatively, A=(number of allocated PRBs)×(number of reference REs per PRB)×Qm S R S v.

Step 2 may be performed as shown in [pseudo-code 8] or [pseudo-code 9].

---

[pseudo-code 8]
[Start]
If R ≤ R1,
  If A ≤ $N_{2,max}$,
    C=1 and
$$TBS = \left\lceil \frac{A}{\alpha \times 8} \right\rceil \times \alpha \times 8 - L_{TB,16}.$$
  Else
$$C = \left\lceil \frac{A}{N_{2,\max} - L_{CB,24}} \right\rceil$$
$$TBS = \left\lceil \frac{A}{\alpha \times C \times 8} \right\rceil \times \alpha \times C \times 8 - L_{TB,24}$$
  End if of A
Else
  If A ≤ $N_{1,max}$,
    C=1 and
$$TBS = \left\lceil \frac{A}{\alpha \times 8} \right\rceil \times \alpha \times 8 - L_{TB,24}.$$
  Else
$$C = \left\lceil \frac{A}{N_{1,\max} - L_{CB,24}} \right\rceil$$
$$TBS = \left\lceil \frac{A}{\alpha \times C \times 8} \right\rceil \times \alpha \times C \times 8 - L_{TB,24}$$
  End if of A
End if of R
[End]

---

[pseudo-code 9]
[Start]
If R ≤ ¼,
  If A ≤ 3824,
    C=1 and
$$TBS = \left\lceil \frac{A}{8} \right\rceil \times 8.$$
  Else
$$C = \left\lceil \frac{A+24}{3816} \right\rceil$$
$$TBS = \left\lceil \frac{A+24}{c \times 8} \right\rceil \times C \times 8 - 24$$
  End if of A
Else
  If A ≤ 8424,
    C=1 and
$$TBS = \left\lceil \frac{A}{8} \right\rceil \times 8.$$
  Else
$$C = \left\lceil \frac{A+24}{8424} \right\rceil$$
$$TBS = \left\lceil \frac{A+24}{c \times 8} \right\rceil \times C \times 8 - 24$$
  End if of A
End if of R
[End]

---

$N_{2,max}$ may be 3840 and $N_{1,max}$ may be 8448, but are not limited thereto. The calculated C may be a value obtained by calculating the number of code blocks included in the corresponding TB. If the calculated C is larger than 1 and smaller than a value obtained by dividing the finally calculated TBS+the CRC length by the maximum code block length, the finally calculated TBS may be determined as $C \times (N_{1,max} - L_{CB,24}) - L_{TB,24}$ or $C \times (N_{2,max} - L_{CB,24}) - L_{TB,24}$. The value obtained b dividing the TBS+CRC length by the maximum code block length may be $$\left\lceil \frac{TBS + L_{TB,24}}{N_{1,max} - L_{CB,24}} \right\rceil \text{ or } \frac{TBS + L_{TB,24}}{N_{1,max} - L_{CB,24}}$$

if the LDPC code using BG #1 is applied, and may be $$\left\lceil \frac{TBS + L_{TB,24}}{N_{2,max} - L_{CB,24}} \right\rceil \text{ or } \frac{TBS + L_{TB,24}}{N_{2,max} - L_{CB,24}}$$

if the LDPC code using BG #2 is applied. In the disclosure, $L_{CB,24}$ may be the length of the CRC added to code block information, and may be 24. In the disclosure, $L^{TB,24}$ may be the length of the CRC added to the TB, and may be 24. In the disclosure, $L_{TB,16}$ may be the length of the CRC added to the TB, and may be 16. The above TBS may not be the final TBS, and the TBS may be finally calculated through [pseudo-code 10] below.

---

[pseudo-code 10]
[Start]
For BG1 LDPC,
  If $C < \left\lceil \frac{TBS + L_{TB,24}}{N_{1,max} - L_{CB,24}} \right\rceil$,
  Then, final TBS is c × ($N_{1,max} - L_{CB,24}$) − $L_{TB,24}$
For BG2 LDPC,
  If $C < \left\lceil \frac{TBS + L_{TB,24}}{N_{2,max} - L_{CB,24}} \right\rceil$,
  Then, final TBS is c × ($N_{2,max} - L_{CB,24}$) − $L_{TB,24}$
[End]

---

[pseudo-code 10] is to make the number of code blocks be C when conventionally calculated C becomes different from the number of actual code blocks during the process of making the TBS, including conventionally calculated C.

Figure 14:
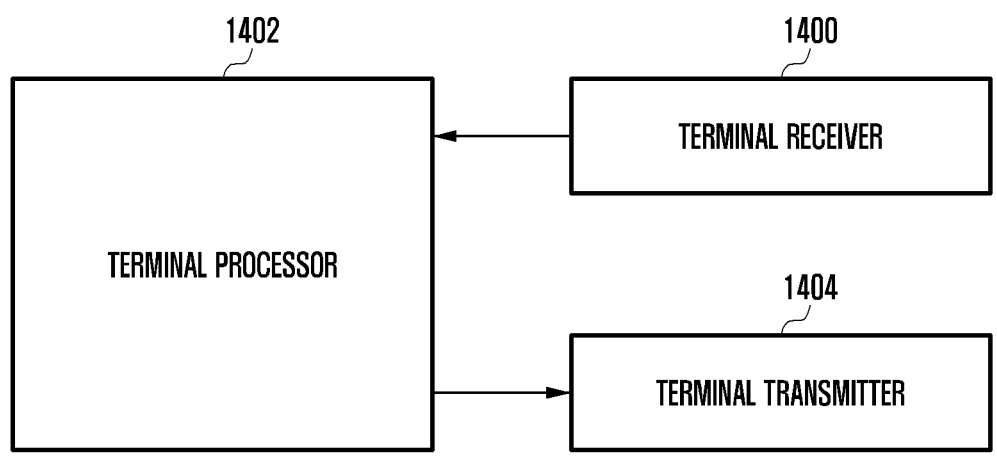
FIG. 14 is a block diagram illustrating the structure of the terminal according to embodiments.
Figure 15:
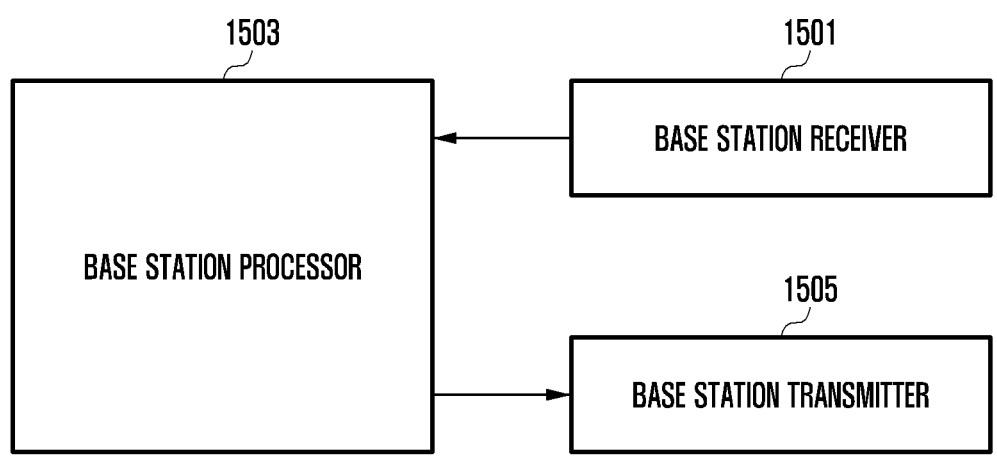
FIG. 15 is a block diagram illustrating the structure of the base station according to embodiments.

In order to perform the above-described embodiments of the disclosure, a transmitter, a receiver, and a processor of each of the terminal and the base station are illustrated in FIGS. 14 and 15. [Embodiment 1] to [Embodiment 6] provide the transmission and reception methods of the base station and the terminal to determine a rate-matching method when the base station and the terminal transmit and receive data and perform operation according thereto, and the receiver, the processor, and the transmitter of each of the base station and the terminal is required to operate according to each embodiment in order to perform the methods.

Specifically, FIG. 14 is a block diagram illustrating the internal structure of the terminal according to an embodiment of the disclosure. As illustrated in FIG. 14, the terminal of the disclosure may include a terminal receiver 1400, a terminal transmitter 1404, and a terminal processor 1402. The terminal receiver 1400 and the terminal transmitter 1404 are commonly called a transceiver in the embodiments of the disclosure. The transceiver may transmit and receive a signal to and from the base station. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the terminal processor 1402, and transmit the signal output from the terminal processor 1402 through a radio channel. The terminal processor 1402 may control a series of processes such that the terminal operates according to the above-described embodiments of the disclosure.

FIG. 15 is a block diagram illustrating the internal structure of the base station according to an embodiment of the disclosure. As illustrated in FIG. 15, the base station of the disclosure may include an base station receiver 1501, an base station transmitter 1505, and an base station processor 1503. The base station receiver 1501 and the base station transmitter 1505 are commonly called a transceiver in embodiments of the disclosure. The transceiver may transmit and receive a signal to and from the terminal. The signal may include control information and data. To this end, the transceiver includes an RF transmitter that up-converts and amplifies the frequency of a transmitted signal, an RF receiver that low-noise amplifies a received signal and down-converts the frequency, and the like. Also, the transceiver may receive a signal through a radio channel, output the signal to the base station processor 1503, and transmit the signal output from the base station processor 1503 through a radio channel. The base station processor 1503 may control a series of processes such that the base station operates according to the above-described embodiments of the disclosure.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, some of the embodiments may be combined and operated as necessary. For example, [Embodiment 1] and [Embodiment 2] of the disclosure may be combined, and the base station and the terminal may operate according thereto. The embodiments are described on the basis of a 5G, new radio (NR), or LTE system, but other modified embodiments based on the technical idea of the embodiments may be applied to other systems.

The invention claimed is:

1. A method performed by a terminal in a wireless communication system, the method comprising:
identifying that a limited buffer rate matching (LBRM) is configured;
generating encoded bits based on information bits;
performing rate matching on the encoded bits based on the LBRM; and
transmitting, to a base station, the rate-matched encoded bits,
wherein a size of a circular buffer for the rate matching is determined based on a reference transport block size (TBS) and a reference code rate for the LBRM.

2. The method of claim 1, wherein the reference code rate is 2/3.

3. The method of claim 1, wherein the size of the circular buffer, $N_{cb}$, is determined based on $$\left\lfloor \frac{TBS_{ref}}{C * R_{ref}} \right\rfloor,$$

where $TBS_{ref}$ is a value of the reference TBS, C is a number of code blocks of the encoded bits, and $R_{ref}$ is the reference code rate.

4. The method of claim 3, wherein the size of the circular buffer, $N_{cb}$, is determined as a following equation:

$$N_{cb} = \min\left( \left\lfloor \frac{TBS_{ref}}{C * R_{ref}} \right\rfloor, K_w \right),$$

where $K_w$ is a number of bits of the encoded bits by low density parity check, LDPC, coding, and
wherein the rate matching is performed based on the size of the circular buffer.

5. The method of claim 1,
wherein the reference TBS is obtained based on at least one parameter for determining a maximum TBS.

6. The method of claim 1,
wherein the size of the circular buffer is determined based on a value obtained by a product of the reference TBS and 1/the reference code rate.

7. A method performed by a base station in a wireless communication system, the method comprising:
identifying that a limited buffer rate matching (LBRM) is configured;
generating encoded bits based on information bits;
performing rate matching on the encoded bits based on the LBRM; and
transmitting, to a terminal, the rate-matched encoded bits,
wherein a size of a circular buffer for the rate matching is determined based on a reference transport block size (TBS) and a reference code rate for the LBRM.

8. The method of claim 7,
wherein the reference TBS is obtained based on at least one parameter for determining a maximum TBS.

9. The method of claim 7,
wherein the size of the circular buffer is determined based on a value obtained by a product.

10. The method of claim 7, wherein the size of the circular buffer, $N_{cb}$, is determined based on $$\left\lfloor \frac{TBS_{ref}}{C * R_{ref}} \right\rfloor,$$

where $TBS_{ref}$ is a value of the reference TBS, C is a number of code blocks of the encoded bits, and $R_{ref}$ is the reference code rate, and
wherein the reference code rate is 2/3.

11. The method of claim 10, wherein the size of the circular buffer, $N_{cb}$, is determined as a following equation:

$$N_{cb} = \min\left( \left\lfloor \frac{TBS_{ref}}{C * R_{ref}} \right\rfloor, K_w \right),$$

where $K_w$ is a number of bits of the encoded bits by low density parity check, LDPC, coding, and
wherein the rate matching is performed based on the size of the circular buffer.

12. A base station transmitting a signal in a wireless communication system, the base station comprising:
a transceiver configured to transmit and receive a signal; and
a controller configured to:
identify that a limited buffer rate matching (LBRM) is configured;
generate encoded bits based on information bits,
perform rate matching on the encoded bits based on the LBRM, and
transmit, to a terminal, the rate-matched encoded bits,
wherein a size of a circular buffer for the rate matching is determined based on a reference transport block size (TBS) and a reference code rate for the LBRM.

13. The base station of claim 12, wherein the reference code rate is 2/3.

14. The base station of claim 13, wherein the size of the circular buffer, $N_{cb}$, is determined based on $$\left\lfloor \frac{TBS_{ref}}{C * R_{ref}} \right\rfloor,$$

where $TBS_{ref}$ is a value of the reference TBS, C is a number of code blocks of the encoded bits, and $R_{ref}$ is the reference code rate.

15. The base station of claim 14, wherein the size of the circular buffer, $N_{cb}$, is determined as a following equation:

$$N_{cb} = \min\left(\left\lfloor \frac{TBS_{ref}}{C * R_{ref}} \right\rfloor, K_w\right),$$

where $K_w$ is a number of bits of the encoded bits by low density parity check, LDPC, coding, and
wherein the rate matching is performed based on the size of the circular buffer.

16. A terminal transmitting a signal in a wireless communication system, the terminal comprising:
a transceiver configured to transmit and receive a signal; and
a controller configured to:
identify that a limited buffer rate matching (LBRM) is configured,
generate encoded bits based on information bits,
perform rate matching on the encoded bits based on the LBRM, and
transmit, to a base station, the rate-matched encoded bits,
wherein a size of a circular buffer for the rate matching is determined based on a reference transport block size (TBS) and a reference code rate for the LBRM.

17. The terminal of claim 16, wherein the reference code rate is 2/3.

18. The terminal of claim 16, wherein the size of the circular buffer, $N_{cb}$, is determined based on $$\left\lfloor \frac{TBS_{ref}}{C * R_{ref}} \right\rfloor,$$

where $TBS_{ref}$ is a value of the reference TBS, C is a number of code blocks of the encoded bits, and $R_{ref}$ is the reference code rate.

19. The terminal of claim 18, wherein the size of the circular buffer, $N_{cb}$, is determined as a following equation:

$$N_{cb} = \min\left(\left\lfloor \frac{TBS_{ref}}{C * R_{ref}} \right\rfloor, K_w\right),$$

where $K_w$ is a number of bits of the encoded bits by low density parity check, LDPC, coding, and
wherein the rate matching is performed based on the size of the circular buffer.

* * * * *